United States Patent
Alezi et al.

(10) Patent No.: US 10,322,402 B2
(45) Date of Patent: Jun. 18, 2019

(54) METAL ORGANIC FRAMEWORKS FOR GAS STORAGE

(71) Applicant: King Abdullah University of Science and Technology, Thuwal (SA)

(72) Inventors: Dalal Alezi, Thuwal (SA); Youssef Belmabkhout, Thuwal (SA); Mohamed Eddaoudi, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 15/532,839

(22) PCT Filed: Dec. 4, 2015

(86) PCT No.: PCT/IB2015/059383
§ 371 (c)(1),
(2) Date: Jun. 2, 2017

(87) PCT Pub. No.: WO2016/088106
PCT Pub. Date: Jun. 9, 2016

(65) Prior Publication Data
US 2018/0264434 A1    Sep. 20, 2018

Related U.S. Application Data

(60) Provisional application No. 62/087,517, filed on Dec. 4, 2014.

(51) Int. Cl.
*B01D 53/02* (2006.01)
*B01D 53/14* (2006.01)
(Continued)

(52) U.S. Cl.
CPC ............ *B01J 20/226* (2013.01); *B01D 53/02* (2013.01); *B01D 53/0476* (2013.01);
(Continued)

(58) Field of Classification Search
None
See application file for complete search history.

(56) References Cited

U.S. PATENT DOCUMENTS 9,102,691 B2    8/2015    Zhou et al.
9,724,668 B2    8/2017    Zhou et al.

FOREIGN PATENT DOCUMENTS

WO    2016033086 A1    3/2016

OTHER PUBLICATIONS

Babarao, et al., "Molecular simulations for adsorptive separation of CO2/CH4 Mixture in metal-exposed, catenated, and charged metal-Organic Frameworks", Langmuir Article, 2009, 5239-5247.
(Continued)

*Primary Examiner* — Daniel Berns
(74) *Attorney, Agent, or Firm* — Billion & Armitage; Benjamin C. Armitage

(57) ABSTRACT

Embodiments provide a method of storing a compound using a metal organic framework (MOF). The method includes contacting one or more MOFs with a fluid and sorbing one or more compounds, such as O2 and CH4. O2 and CH4 can be sorbed simultaneously or in series. The metal organic framework can be an M-soc-MOF, wherein M can include aluminum, iron, gallium, indium, vanadium, chromium, titanium, or scandium.

20 Claims, 17 Drawing Sheets

(51) Int. Cl.
- *B01D 53/46* (2006.01)
- *B01D 53/72* (2006.01)
- *B01D 53/80* (2006.01)
- *B01D 53/81* (2006.01)
- *B01D 53/96* (2006.01)
- *B01J 31/16* (2006.01)
- *B01J 20/22* (2006.01)
- *C10L 3/06* (2006.01)
- *C10L 3/10* (2006.01)
- *B01D 53/047* (2006.01)
- *F17C 11/00* (2006.01)

(52) U.S. Cl.
CPC ...... *B01D 53/047* (2013.01); *B01D 2253/204* (2013.01); *B01D 2257/104* (2013.01); *B01D 2257/7025* (2013.01); *B01D 2258/05* (2013.01); *B01D 2259/4525* (2013.01); *F17C 11/007* (2013.01); *Y02C 20/20* (2013.01)

(56) References Cited

OTHER PUBLICATIONS

Moellmer, et al., "Insights on Adsorption Characterization of Metal-Organic Frameworks: A Benchmark Study on the Novel soc-MOF", Microporus and Mesoporous Materials, Elsevier Science Publishing, New York, US, 345-353, Apr. 15, 2010.

Mowat, et al., "Synthesis, characterisation and adsorption properties of microporous scandium carboxylates with ridig and flexible frameworks", Microporous and Mesoporous Materials, 2011, 322-333.

Peng, et al., "Computational screening of porous carbons, zeolites, and metal organic frameworks for desulfurization and decarburization of biogas, natural gas, and flue gas", AIChE Journal, Aug. 2013, 2928-2942.

"International Search Report and Written Opinion", International Application No. PCT/US2015/046756, dated Nov. 2, 2015, 10 pages.

Belmabkhout, et al., "Simultaneous Adsorption of H2S and CO2 on Triamine-Grafted Pore-Expanded Mesoporous MCM-41 Silica", Energy Fuels 2011, 25, 1310-1315.

Christophe, et al., "Synthesis, Single-Crystal X-ray Microdiffraction, and NMR Characterizations of the Giant Pore Metal-Organic Framework Aluminum Trimesate MIL-100", Chemistry of Materials Communication, American Chemical Society, 2009, 5695-5697.

Felipe, et al., "High Methane Storage Capacity in Aluminum Metal-Organic Frameworks", Journal of the American Chemical Society, 2014, 5271-5274.

Hiroyasu, et al., "Ultrahigh Porosity in Metal-Organic Frameworks", Science, vol. 329, Jul. 23, 2010, 424-429.

Liu, et al., "Assembly of Metal-organic Frameworks (MOFs) Based on Indium-Trimr Building Blocks: a Porous MOF with soc Topology and High Hydrogen Storage", Angew. Chem. Int. Ed. 2007, 46, 3278-3283.

Moeller, et al., "Insights on Adsorption Characterization of Metal-Organic Frameworks: A benchmark Study on the Novel soc-MOF", Microporous and Mesoporous Materials, 2010, 345-353.

Mohamed, et al., "Zeolite-like metal-organic frameworks (ZMOFs): design, synthesis, and properties", Chem Soc Rev, Royal Society of Chemistry, 2015, 228-249.

Morris, et al., "Gas Storage in Nanoporous Materials", Gas Storage Materials, Angewandte Chemie Int. Ed., 2008, 4966-4981.

Mueller, et al., "Metal-organic frameworks—prospective industrial applications", Journal of Materials Chemistry, 2006,626-636.

Pang, et al., "Highly monodisper M'-based soc-MOFs(M=In and Ga) with cubic and truncated cubic morphologies", Journal of the American Chemical Society, 2012, 13176-13179.

Thomas, et al., "High valence 3p and transition metal based MOFs", Chem Soc Rev, Royal Society of Chemistry, 2014, 6097-6115.

Vincent, et al., "A Supermolecular building approach for the design and construction of metal-organic frameworks", Chem Soc Rev, Royal Society of Chemistry, 2014, 6141-6172.

Yabing, et al., "Methane storage in metal-organic frameworks", Chem Soc Rev, Royal Society of Chemistry, 2014, 5657-5678.

Yu, et al., "High Pressure Excess Isotherms for Adsorption of Oxygen and Nitrogen in Zeolites", Langmuir, 2011, 10648-10656.

METAL ORGANIC FRAMEWORKS FOR GAS STORAGE

This application is a National Stage Application of PCT/IB2015/059383, filed on Dec. 4, 2015, which claims benefit of U.S. Provisional Application No. 62/087,517, filed on Dec. 4, 2014 and which applications are incorporated herein by reference. A claim of priority to all, to the extent appropriate, is made.

BACKGROUND

Today there is an increasing global desire to reduce greenhouse gas emissions and develop clean alternative vehicle fuels. Methane ($CH_4$), the primary component of natural gas, is of particular interest as it is abundant and has lower $CO_2$ emission and more efficient combustion than other hydrocarbons due its high H/C ratio. In addition to industry-driven demand for stationary gaseous storage, global governmental initiatives have created incentives to develop vehicular gaseous fuel storage.

Gas storage in porous materials has experienced significant development in recent years in various industrial applications related to energy, environment, and medicine. Among porous materials, metal organic frameworks (MOFs) are a versatile and promising class of crystalline solid state materials which allow porosity and functionality to be tailored towards various applications. MOF crystal chemistry uses a molecular building block (MBB) approach that offers potential to construct MOFs where desired structural and geometrical information are incorporated into the building blocks prior to the assembly process. Choosing an ideal blueprint net and isolating the reaction conditions that permit in situ consistent formation of the corresponding inorganic MBBs are the keys for successfully implementing this approach.

The challenges of constructing MOFs having tailored properties for gas storage applications have limited the use of low cost materials such as aluminum and iron. In particular, low cost materials have not been developed which satisfy the Department of Energy (DOE) CH4 gravimetric uptake target of 700 $cm^3$ STP/g (0.5g/g) at recommended temperatures between −40° C. and 85° C.

SUMMARY

In general, this disclosure describes highly porous metal organic frameworks. In particular, this disclosure describes metal organic frameworks comprising aluminum trimers and organic ligands which network in square-octahedral topology. It should be noted that although the embodiments of this disclosure are described with respect to examples for gas storage, the embodiments described herein are generally applicable to many fields including gas molecule separation, catalysis, sensors, and proton conductivity.

The details of one or more examples are set forth in the accompanying drawings and the description below. Other features, objects, and advantages will be apparent from the description and drawings, and from the claims.

BRIEF DESCRIPTION OF THE DRAWINGS

The accompanying drawings illustrate non-limiting example embodiments of the invention.

DETAILED DESCRIPTION

Figure 1A:
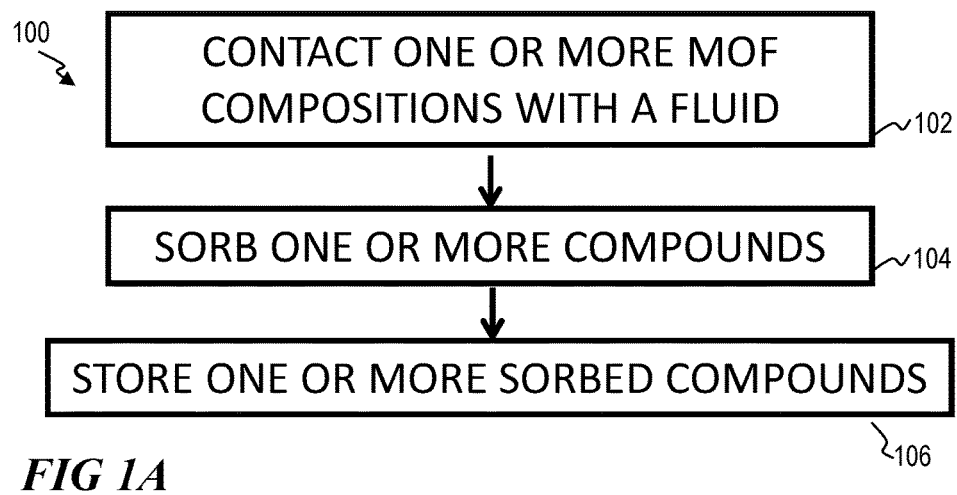
FIG. 1A illustrates a block flow diagram of a method of storing one or more compounds using a metal organic framework, according to one or more embodiments of this disclosure.

The present invention is described with reference to the attached figures, wherein like reference numerals are used throughout the figures to designate similar or equivalent elements. The figures are not drawn to scale and they are provided merely to illustrate the invention. Several aspects of the invention are described below with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Provided herein are M-soc-MOFs having improved surface area, pore volume, and volumetric and gravimetric working capacity. In particular are provided single crystal structures for the first three isoreticular series of aluminum MOFs possessing soc topology and having highly permanent microporosity and high thermal stability. In one embodiment, a highly microporous MOF assembly comprises an aluminum trimer component and a quadrangular ligand component. In some such embodiments, the MOF assembly has a Langmuir specific surface area of more than about 5000 $m^2/g$, more than about 5300 $m^2/g$, more than about 6000 $m^2/g$, or more than about 6300 $m^2/g$. Embodiments provide aluminum MOFs possessing soc topology which require no heat to desorb stored gases such as $CH_4$, and are more easily activated by reducing the pressure to atmospheric pressure or using vacuum techniques not available to other highly porous materials known in the art. Methods provided herein allow for structural alterations of aluminum-soc-MOFs which advantageously tune and/or enhance performance.

FIG. 1 illustrates a block flow diagram of a method 100 of removing one or more compounds from one a fluid, according to an embodiment. Method 100 includes contacting 102 one or more metal organic framework (MOF) compositions with a fluid, sorbing 104 one or more compounds from the fluid with the one or more MOF compositions, and storing 106 one or more sorbed compounds. In particular, method 100 includes contacting 102 one or more M-soc-MOF compositions with a fluid and sorbing 104 one or more compounds from the fluid with the one or more M-soc-MOF compositions. Contacting 102 can include mixing, bringing in close proximity, chemically contacting, physically contacting or combinations thereof. Fluids can include general liquids and gases. In some embodiments, fluids include industrial process fluids. Examples of specific fluids include one or more of natural gas and biogas. Fluids can further comprise water, including water in a liquid form, a gaseous form, or combinations thereof.

In one embodiment, sorbing 104 comprises absorbing. In one embodiment, sorbing 104 comprises adsorbing. In one embodiment, sorbing 104 comprises a combination of adsorbing and absorbing. Sorbing 104 can include selective sorption (i.e., sorption of a single compound), or simultaneous sorption (e.g., sorption of a plurality of compounds). The M-soc-MOF compositions can sorb about 1% to about 99.9%, about 1% to about 90%, about 1% to about 50% or about 1% to about 30% of one or more compounds in a fluid. Sorbing 104 can occur at ambient temperature, at an elevated temperature, at a cooled temperature, or over a temperature range. In one embodiment, a temperature can be selectively changed to manipulate sorption and/or desorption of different compounds. Sorbing 104 can occur at ambient pressure, at an elevated pressure, at a cooled pressure, or over a pressure range. Sorbing 104 can occur at temperatures between about −80° C. and about 125° C., about −60° C. and about 105° C., or about −40° C. and about 85° C. In one embodiment, pressure can be selectively changed to manipulate sorption and/or desorption of different compounds.

In addition to or in the alternative to, a concentration of one or more M-soc-MOF compositions can be varied to affect a rate and/or magnitude of sorbing 104. One or more of temperature, pressure and M-soc-MOF concentration can be regulated to produce a simultaneous sorption of compounds, or a subsequent, step-wise sorption (i.e., in series) of compounds from a fluid. In series sorption generally includes sorbing a quantity of a first compound via a MOF, and subsequently sorbing a quantity of a second compound via the same MOF while at least a portion of the quantity of the first compound remains sorbed. Simultaneous sorption generally includes contacting a plurality of compounds with an MOF, and sorbing a quantity of each of the two compounds with the MOF. Storing 106 can occur at temperatures between about −80° C. and about 125° C., about −60° C. and about 105° C., or about −40° C. and about 85° C.

Storing 106 comprises maintaining a sorbed compound in a sorbed state for a period of time. A sorbed state can include an adsorbed state, an absorbed state, or combinations thereof. Maintaining a sorbed compound in a sorbed state allows for the sorbed compound to change or oscillate between multiple sorbed states.

One compound which can be sorbed by an M-soc-MOF from a fluid is $O_2$. One compound which can be sorbed by an M-soc-MOF from a fluid is $CH_4$. $O_2$ and $CH_4$ can be simultaneously sorbed from a fluid by an M-soc-MOF. $O_2$ and $CH_4$ can be sorbed from a fluid in series by an M-soc-MOF. After sorbing 104, one or more of $O_2$ and $CH_4$ can be stored 106 by the M-soc-MOF. In a specific embodiment, $O_2$ can be stored 106 by an M-soc-MOF. In another specific embodiment, $CH_4$ can be stored 106 by an M-soc-MOF. In another specific embodiment, $O_2$ and $CH_4$ can be simultaneously stored 106 by an M-soc-MOF. Storing 106 can occur on board a vehicle, such as a seacraft, landcraft, aircraft, or spacecraft. Generally, the above sorption and storage abilities are capable in the presence of water and $H_2S$, such stability constituting an advantageous aspect unavailable from other MOFs and industrial materials such as zeolites and activated carbon. Further, particular M-soc-MOFs, such as Al-soc-MOFs and Fe-soc-MOFs, exhibit further advantages from the use of lightweight and/or inexpensive materials.

Figure 1B:
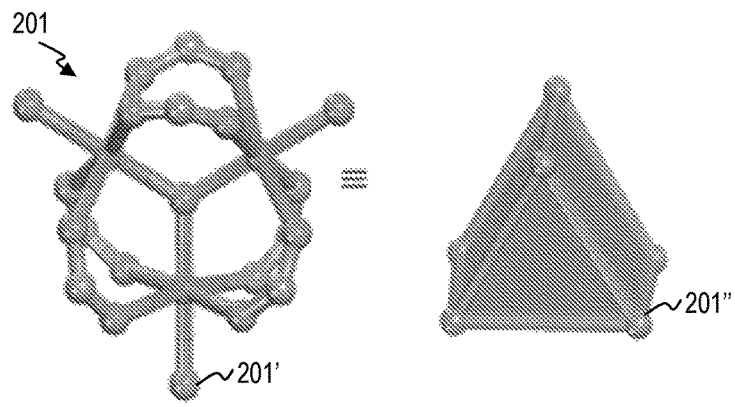
FIG. 1B illustrates a ball-and-stick structure and a polyhedral representation of a trimer molecular building block, according to one or more embodiments.
Figure 1C:
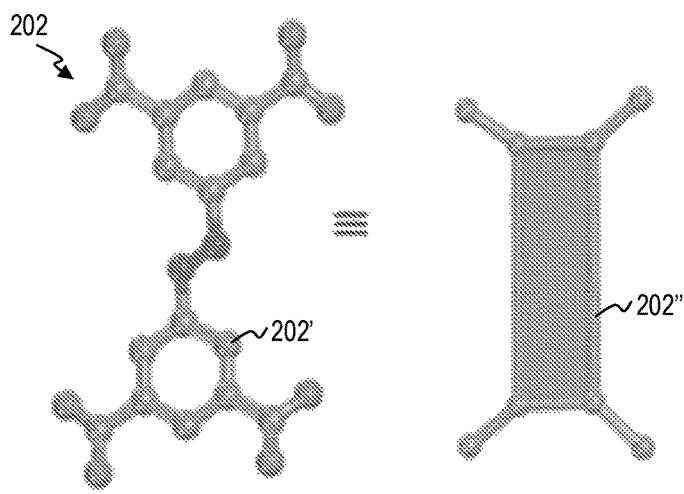
FIG. 1C illustrates a ball-and-stick structure and a polyhedral representation of a suitable organic ligand, according to one or more embodiments.

M-soc-MOFs suitable for method 100 include M-soc-MOFs 200 comprising one or more trimer molecular building blocks (TMBB) 201, as shown in FIG. 1B, and one or more organic ligands 202, an example of which is shown in FIG. 1C. FIG. 1B illustrates a ball-and-stick structure 201' and a polyhedral representation 201" of a TMBB 201. FIG. 1C illustrates a ball-and-stick structure 202' and a polyhedral representation 202" of one example of a suitable organic ligand 202. Isostructural square-octahedral M-soc-MOFs are built by linking the 6-connected TMBBs and the 4-connected organic ligands, resembling trigonal prismatic building units (BUs) and rectangular BUs respectively, to generate an overall 3D cationic framework having an edge-transitive (4,6) soc-topology.

A TMBB 201 comprises three metal carboxylate octahedra, each octahedral generally described as [MO$_5$(H$_2$O)], wherein M=a metal. A TMBB 201 can be generally described as M$_3$O$_x$(CO$_2$)$_y$. In some embodiments, a TMBB 201 can be generally described as (M$_3$O(O$_2$CR)$_6$), wherein R is an organic moiety, or any functional group capable of coordinating to the metal. The three metal octahedra are metal-centered, and all share one central $\mu_3$-oxo anion. In each octahedron, the apical position can be occupied by a terminal water molecule. The metal-carboxylate clusters generate a rigid node with fixed geometry involving multiple metal-oxygen coordination bonds which induce the stability of the node and subsequently enhance the thermal stability and overall rigidity of the framework. One example of a TMBB 201 can be described as [Ga$_3$O(CO$_2$)$_6$(H$_2$O)$_3$], or [Ga$_3$O(CO$_2$)$_6$] with the H$_2$O guest molecule species omitted for clarity. One example of a TMBB 201 can be described as [In$_3$O(CO$_2$)$_6$]. One example of a TMBB 201 can be described as [Al$_3$O (CO$_2$)$_6$]. One example of a TMBB 201 can be described as [Al$_3$O (CO$_2$)$_6$]. One example of a TMBB 201 can be described as [Fe$_3$O(CO$_2$)$_6$]. One example of a TMBB 201 can be described as [Sc$_3$O(CO$_2$)$_6$]. One example of a TMBB 201 can be described as [Cr$_3$O(CO$_2$)$_6$]. One example of a TMBB 201 can be described as [V$_3$O(CO$_2$)$_6$].

Suitable metals (M) include trivalent metals (i.e., metals capable of exhibiting a +3 oxidation state). Trivalent metals include aluminum, scandium, titanium, vanadium, chromium, manganese, iron, cobalt, nickel, copper, gallium, germanium, arsenic, yittrium, zirconium, niobium, molybdenum, palladium, silver, indium, tin, antimony, lanthanum, cerium, praseodymium, samarium, europium gadolinium, terbium, erbium, thulium, ytterbium, lutetium, tantalum, tungsten, rhenium, osmium, iridium, platinum, gold, lead, and bismuth. Particularly suitable trivalent metals include gallium, indium, iron, scandium, and aluminum. The three trivalent metals yield an overall cationic framework (+1 per formula unit) that can be balanced, for example, by [Cl]$^{-1}$ ions. In such an example, the disordered [Cl]$^{-1}$ ions occupy statistically two positions on the threefold axis with equal probability. A broad range of suitable trivalent metals advantageously allows for M-soc-MOFs to be customized for particular purposes. For example, lighter trivalent metals can provide an M-soc-MOF with increased sorption uptake per unit volume.

Figure 1D:
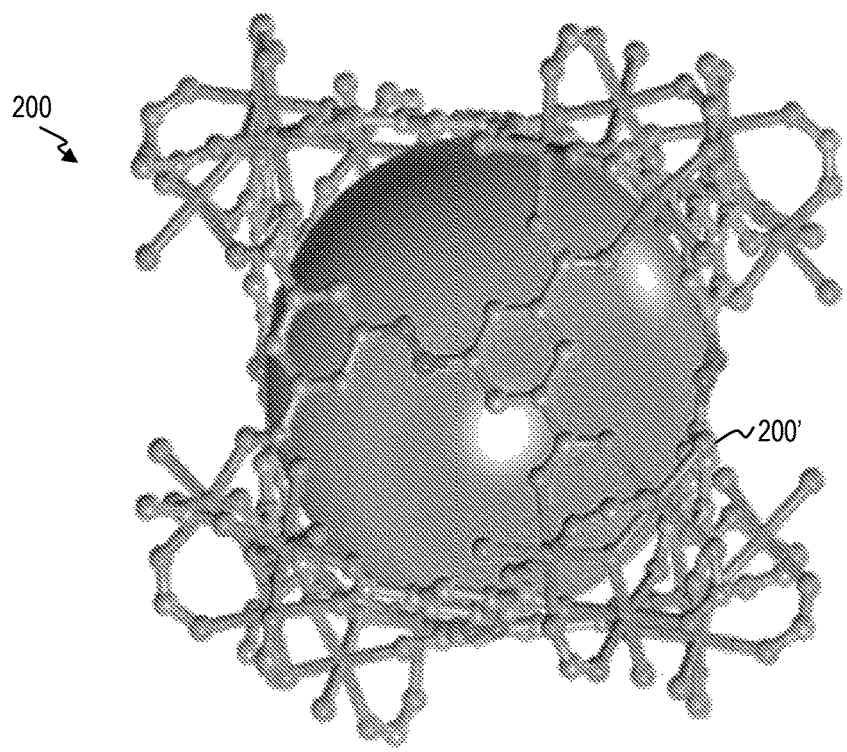
FIG. 1D illustrates a ball-and-stick structure and a polyhedral representation of a M-soc-MOF, according to one or more embodiments.
Figure 1D:
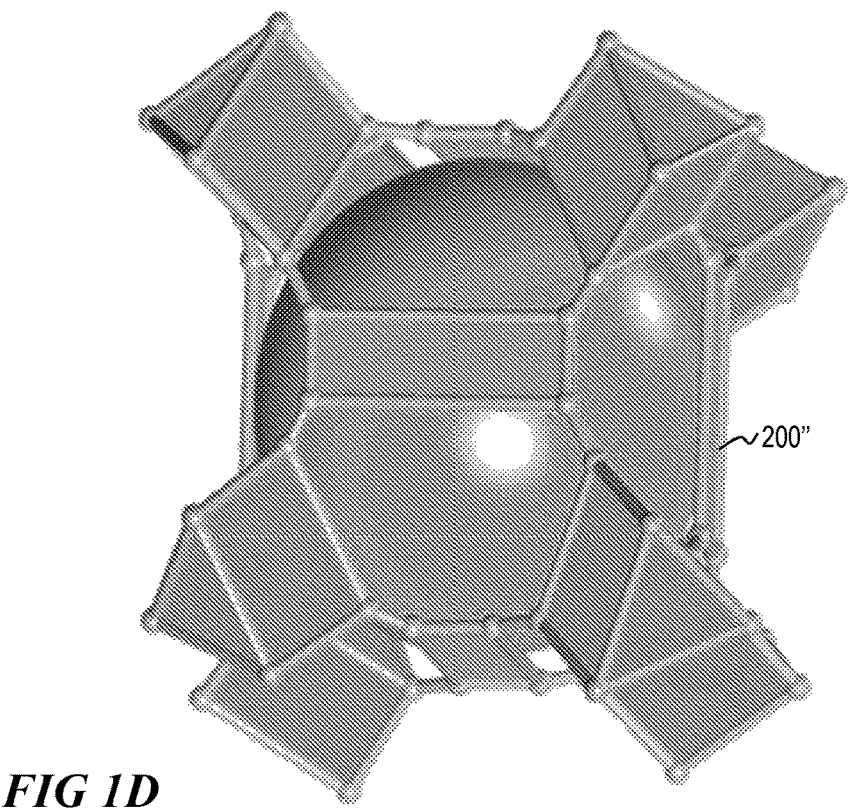

Each TMBB unit is linked by six separate organic ligands 202, as shown in FIG. 1B, to produce a novel 3D structure 200 having an soc-topology, as shown in FIG. 1D. Suitable ligands are tetradentate. Suitable tetradentate ligands include rectangular planar ligands. A generally suitable ligand is a tetracarboxylate ligand.

One particular suitable ligand is 3,3",5,5"-tetrakis(4-carboxyphenyl)-p-terphenyl (TCPT):

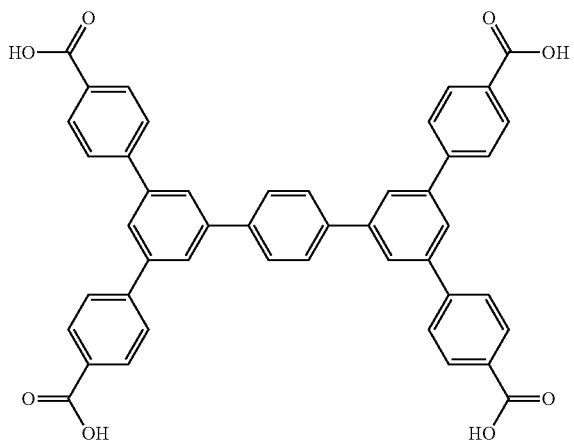 [SMILES: O=C(O)c1ccc(-c2cc(-c3ccc(C(=O)O)cc3)cc(-c3ccc(-c4cc(-c5ccc(C(=O)O)cc5)cc(-c5ccc(C(=O)O)cc5)c4)cc3)c2)cc1]

One particular suitable ligand is 3',3",5',5"-tetrakis(4-carboxyphenyl)- 1,4-diphenylnaphthalene (TCDPN):

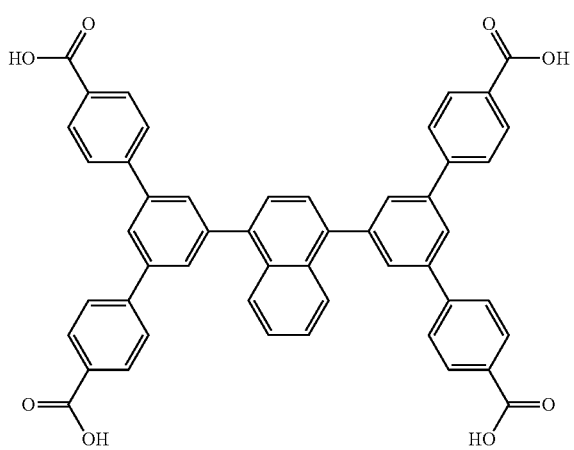 [SMILES: O=C(O)c1ccc(-c2cc(-c3ccc(C(=O)O)cc3)cc(-c3ccc(-c4cc(-c5ccc(C(=O)O)cc5)cc(-c5ccc(C(=O)O)cc5)c4)c4ccccc34)c2)cc1]

One particular suitable ligand is 3',3",5',5"-tetrakis(4-carboxyphenyl)-9,10-diphenylanthracene (TCDPA):

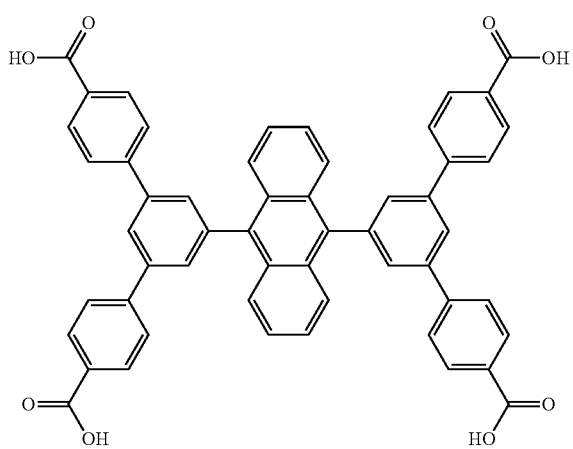 [SMILES: O=C(O)c1ccc(-c2cc(-c3ccc(C(=O)O)cc3)cc(-c3c4ccccc4c(-c4cc(-c5ccc(C(=O)O)cc5)cc(-c5ccc(C(=O)O)cc5)c4)c4ccccc34)c2)cc1]

One particular suitable ligand is 2",3",5",6"-tetrabromo-5',5'"-bis(4-carboxyphenyl)- [1,1':3',1":4", 1"':3"',1""-quinquephenyl]-4,4""-dicarboxylic acid:

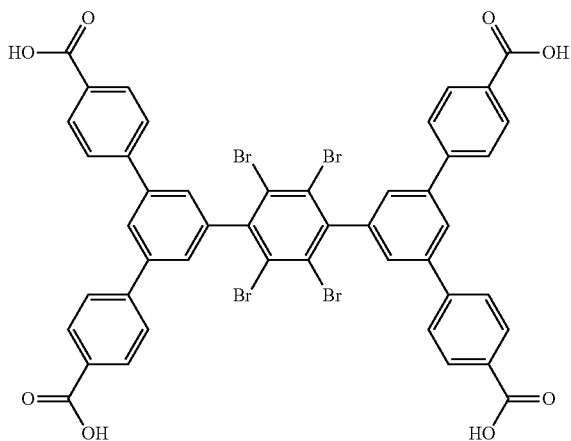 [SMILES: O=C(O)c1ccc(-c2cc(-c3ccc(C(=O)O)cc3)cc(-c3c(Br)c(Br)c(-c4cc(-c5ccc(C(=O)O)cc5)cc(-c5ccc(C(=O)O)cc5)c4)c(Br)c3Br)c2)cc1]

One particular suitable ligand is 2",3",5"-tribromo-5',5'''-bis(4-carboxyphenyl)-[1,1':3',1":4",1''':3''',1''''-quinquephenyl]-4,4''''-dicarboxylic acid:

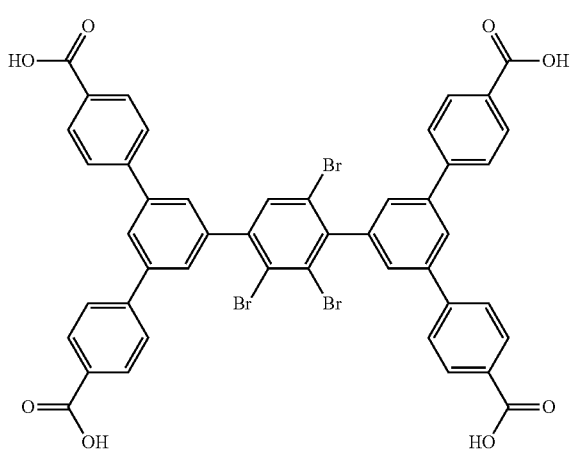 [SMILES: O=C(O)c1ccc(-c2cc(-c3ccc(C(=O)O)cc3)cc(-c3cc(Br)c(-c4cc(-c5ccc(C(=O)O)cc5)cc(-c5ccc(C(=O)O)cc5)c4)c(Br)c3Br)c2)cc1]

One particular suitable ligand is 2",5"-dibromo-5',5'''-bis(4-carboxyphenyl)-[1,1':3',1":4",1''':3''',1''''-quinquephenyl]-4,4''''-dicarboxylic acid:

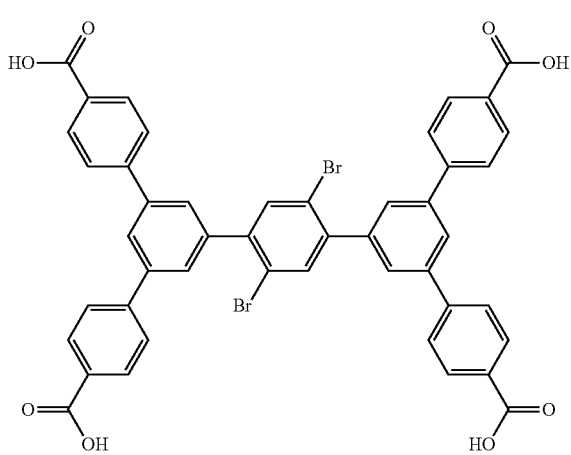

One particular suitable ligand is 2",3"-dibromo-5',5'''-bis(4-carboxyphenyl)-[1,1':3',1":4",1''':3''',1''''-quinquephenyl]-4,4''''-dicarboxylic acid:

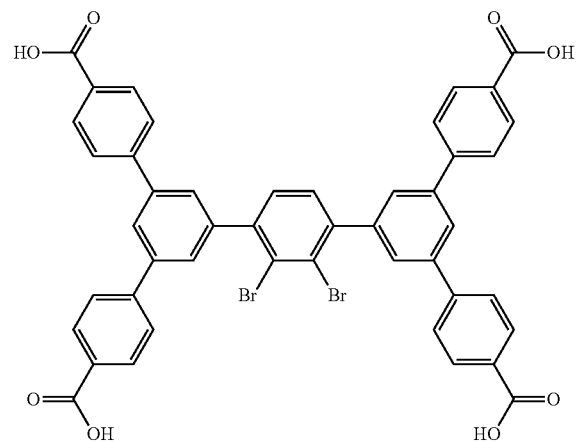 [SMILES: O=C(O)c1ccc(-c2cc(-c3ccc(C(=O)O)cc3)cc(-c3ccc(-c4cc(-c5ccc(C(=O)O)cc5)cc(-c5ccc(C(=O)O)cc5)c4)c(Br)c3Br)c2)cc1]

One particular suitable ligand is 5',5'''-bis(4-carboxyphenyl)-2"-(trifluoromethyl)-[1,1':3',1":4",1''':3''',1''''-quinquephenyl]-4,4''''-dicarboxylic acid:

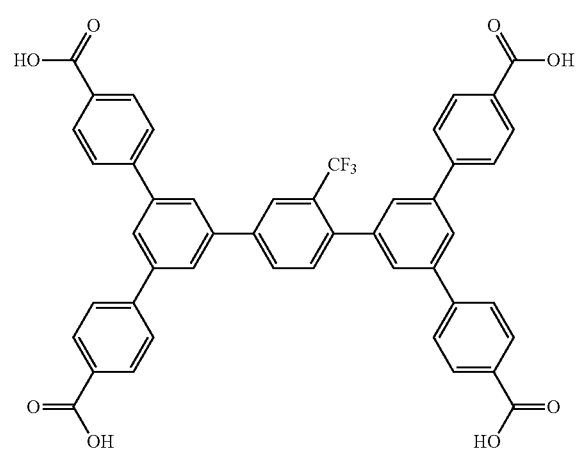 [SMILES: O=C(O)c1ccc(-c2cc(-c3ccc(C(=O)O)cc3)cc(-c3ccc(-c4cc(-c5ccc(C(=O)O)cc5)cc(-c5ccc(C(=O)O)cc5)c4)c(C(F)(F)F)c3)c2)cc1]

One particular suitable ligand is 5',5'''-bis(4-carboxyphenyl)-2",5"-bis(trifluoromethyl)-[1,1':3',1":4",1''':3''',1''''-quinquephenyl]-4,4''''-dicarboxylic acid:

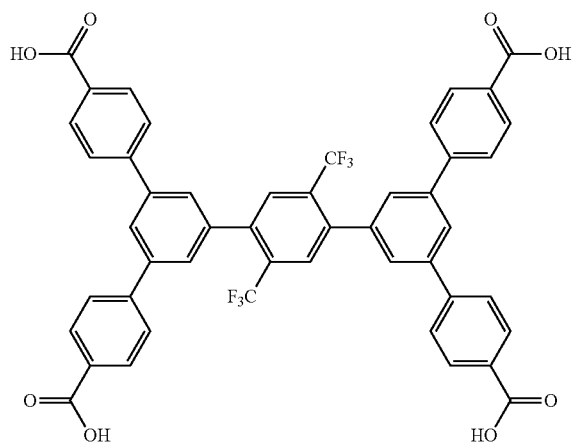 [SMILES: O=C(O)c1ccc(-c2cc(-c3ccc(C(=O)O)cc3)cc(-c3cc(C(F)(F)F)c(-c4cc(-c5ccc(C(=O)O)cc5)cc(-c5ccc(C(=O)O)cc5)c4)cc3C(F)(F)F)c2)cc1]

One particular suitable ligand is 3,3',3'',3'''-([1,1':4',1''-terphenyl]-3,3'',5,5''-tetrayl)tetrapropiolic acid:

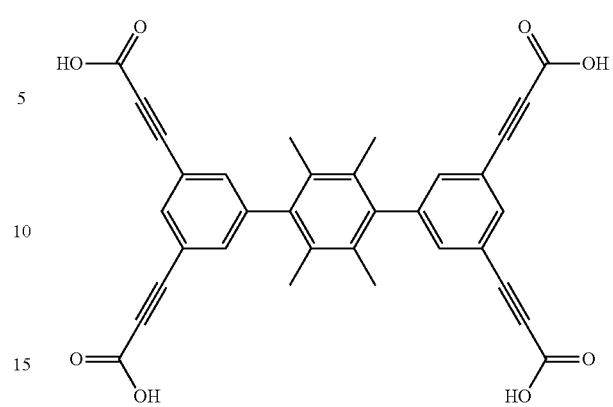

One particular suitable ligand is 3,3',3'',3'''-(ethyne-1,2-diylbis(2,4,6-trimethylbenzene-5,1,3-triyl))tetrapropiolic acid:

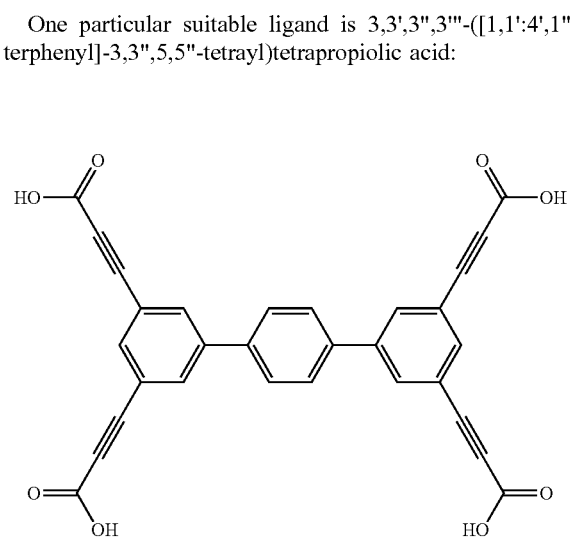

One particular suitable ligand is 3,3',3'',3'''-(ethyne-1,2-diylbis(benzene-5,1,3-triyl))tetrapropiolic acid:

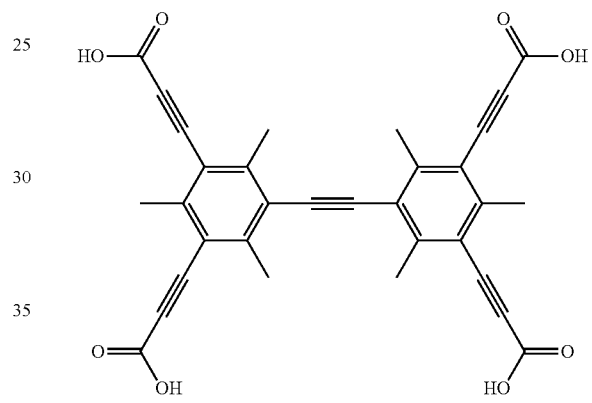

One particular suitable ligand is 4,4',4'',4'''-([1,1':4',1''-terphenyl]-3,3'',5,5''-tetrayltetrakis(ethyne-2,1-diyl))tetrabenzoic acid:

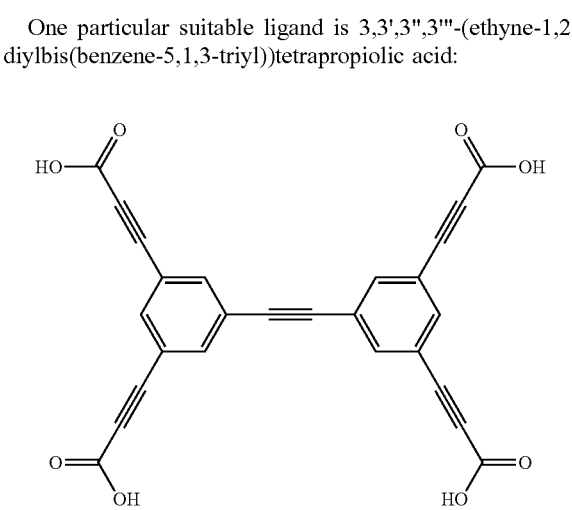

One particular suitable ligand is 3,3',3'',3'''-(2',3',5',6'-tetramethyl-[1,1':4',1''-terphenyl]-3,3'',5,5''-tetrayl)tetrapropiolic acid:

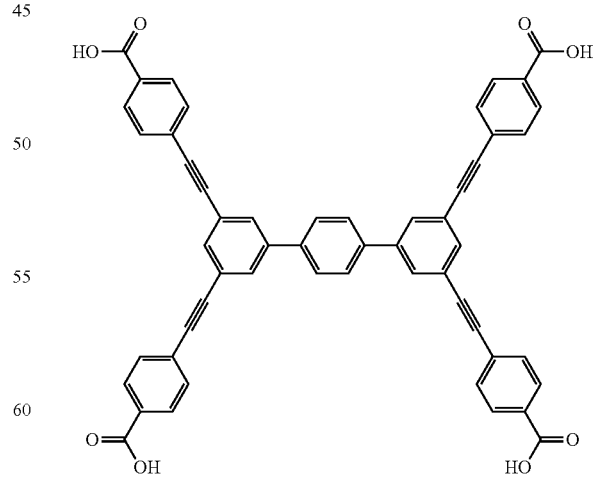

One particular suitable ligand is 4,4',4'',4'''-(((1,4-phenylenebis(ethyne-2,1-diyl))bis(benzene-5,1,3-triyl))tetrakis(ethyne-2,1-diyl))tetrabenzoic acid:

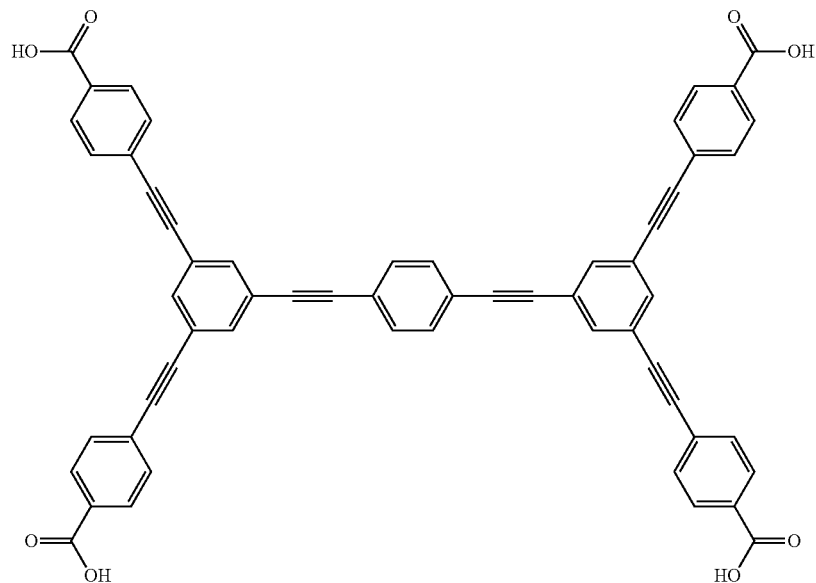 [SMILES: O=C(O)c1ccc(C#Cc2cc(C#Cc3ccc(C#Cc4cc(C#Cc5ccc(C(=O)O)cc5)cc(C#Cc5ccc(C(=O)O)cc5)c4)cc3)cc(C#Cc3ccc(C(=O)O)cc3)c2)cc1]
One particular suitable ligand is 5",5"""-(1,4-phenylenebis(ethyne-2,1-diyl))bis(([1,1':4',1":3",1"':4"',1""-quinquephenyl]-4,4""-dicarboxylic acid)):
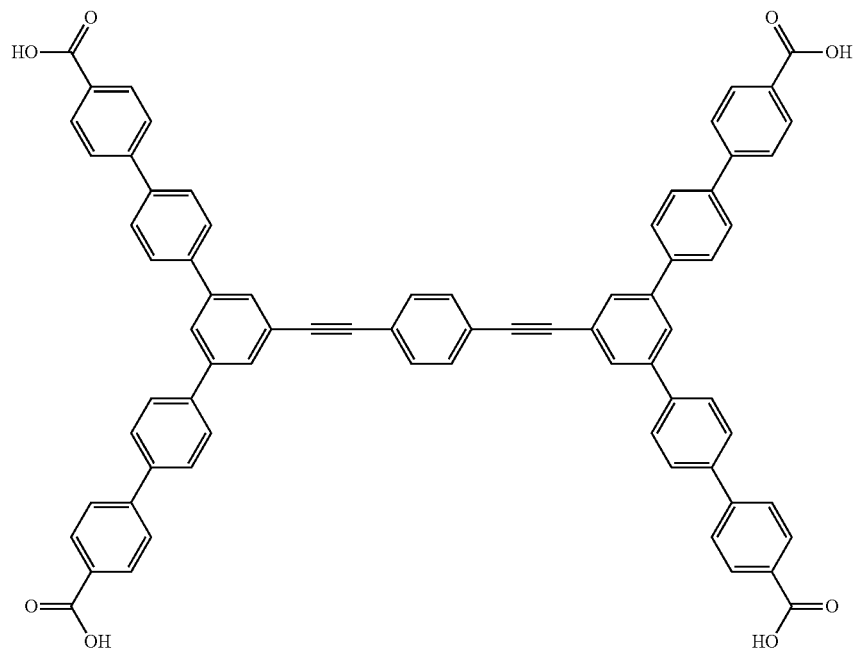 [SMILES: O=C(O)c1ccc(-c2ccc(-c3cc(C#Cc4ccc(C#Cc5cc(-c6ccc(-c7ccc(C(=O)O)cc7)cc6)cc(-c6ccc(-c7ccc(C(=O)O)cc7)cc6)c5)cc4)cc(-c4ccc(-c5ccc(C(=O)O)cc5)cc4)c3)cc2)cc1]
One particular suitable ligand is 5",5"""-(1,4-phenylenebis(([1,1':4',1":3",1"':4"',1""-quinquephenyl]-4,4""-dicarboxylic acid)):

One particular suitable ligand is 0026BIS:
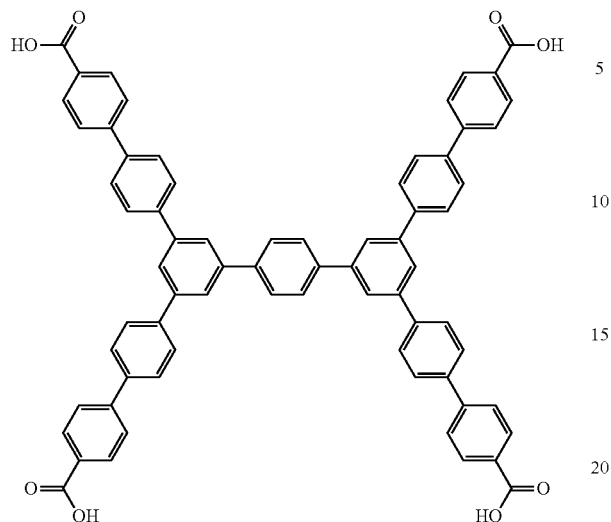
One particular suitable ligand is (E)-5,5'-(diazene-1,2-diyl)diisophthalic acid:
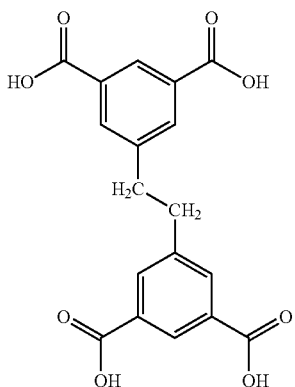
One particular suitable ligand is 5,5'-(ethane-1,2-diyl)diisophthalic acid:
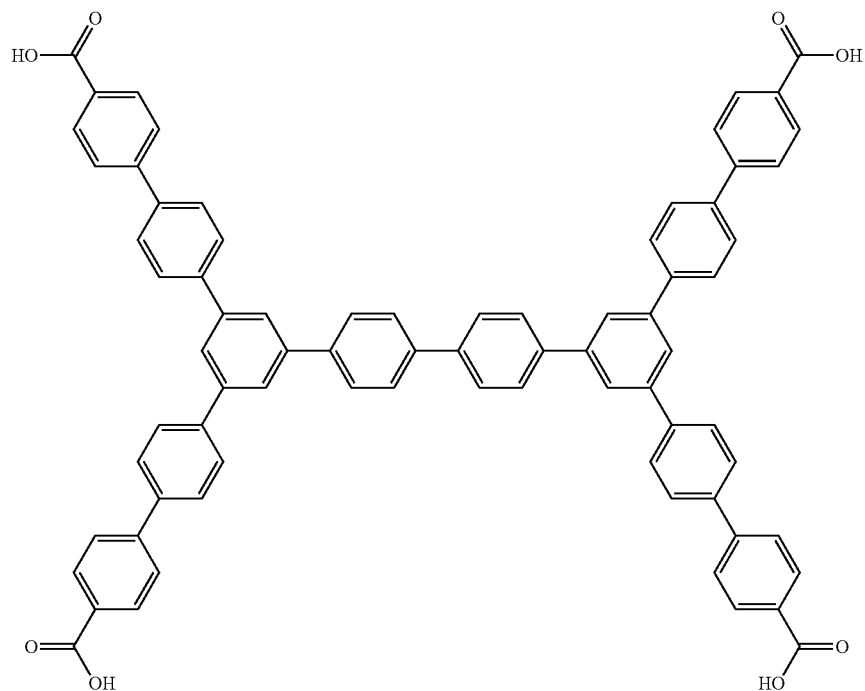 [SMILES: O=C(O)c1ccc(-c2ccc(-c3cc(-c4ccc(-c5ccc(C(=O)O)cc5)cc4)cc(-c4ccc(-c5ccc(-c6cc(-c7ccc(-c8ccc(C(=O)O)cc8)cc7)cc(-c7ccc(-c8ccc(C(=O)O)cc8)cc7)c6)cc5)cc4)c3)cc2)cc1]

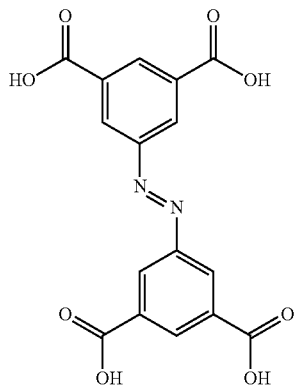 [SMILES: O=C(O)c1cc(/N=N/c2cc(C(=O)O)cc(C(=O)O)c2)cc(C(=O)O)c1]

One particular suitable ligand is amidetetracarboxylate, or 5-(3,5-dicarboxybenzamido)isophthalic acid:

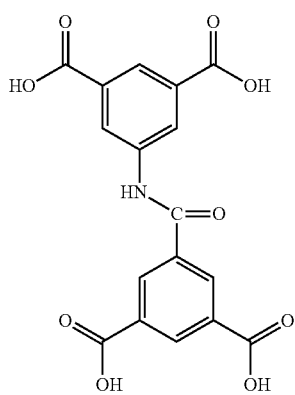 [SMILES: O=C(O)c1cc(NC(=O)c2cc(C(=O)O)cc(C(=O)O)c2)cc(C(=O)O)c1]

One particular suitable ligand is (E)-5,5'-(ethene-1,2-diyl)diisophthalic acid:

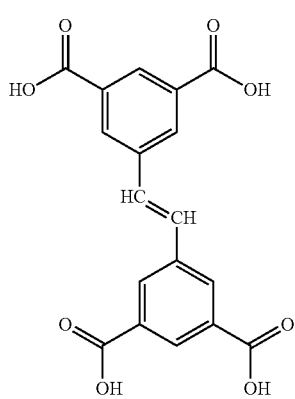 [SMILES: O=C(O)c1cc(/C=C/c2cc(C(=O)O)cc(C(=O)O)c2)cc(C(=O)O)c1]

One particular suitable ligand is 5,5'-(ethyne-1,2-diyl)diisophthalic acid:

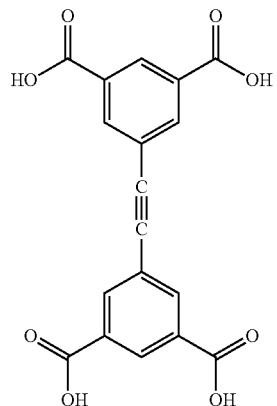 [SMILES: O=C(O)c1cc(C#Cc2cc(C(=O)O)cc(C(=O)O)c2)cc(C(=O)O)c1]

One particular suitable ligand is (Z)-1,2-bis(3,5-dicarboxyphenyl)diazene 1-oxide:

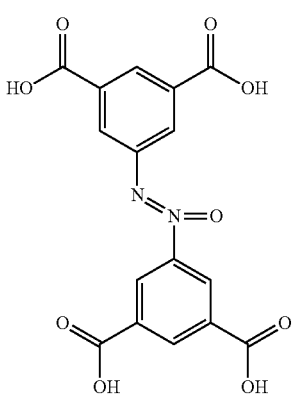 [SMILES: O=C(O)c1cc(/N=[N+](\[O-])c2cc(C(=O)O)cc(C(=O)O)c2)cc(C(=O)O)c1]

One particular suitable ligand is 4,4',4'',4'''-(1,4-phenylenebis(azanetriyl))tetrabenzoic acid:

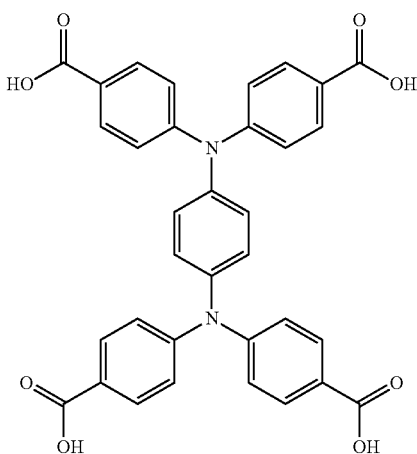 [SMILES: O=C(O)c1ccc(N(c2ccc(C(=O)O)cc2)c2ccc(N(c3ccc(C(=O)O)cc3)c3ccc(C(=O)O)cc3)cc2)cc1]

One particular suitable ligand is 3,3',5,5'-azobenzenetetracarboxylate, or 5,5'-(hydrazine-1,2-diyOdiisophthalic acid:

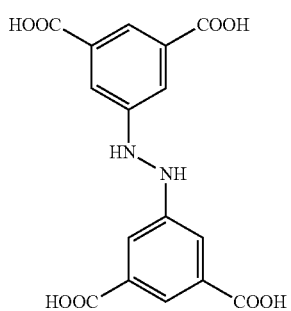 [SMILES: O=C(O)c1cc(NNc2cc(C(=O)O)cc(C(=O)O)c2)cc(C(=O)O)c1]

One particular suitable ligand is 3,3''',5,5'''-tetrakis{4''''-(4'''''-carboxy-[1'''', 1'''''-biphenyl])}-1,1':4',1'':4''', 1'''-quaterphenyl:

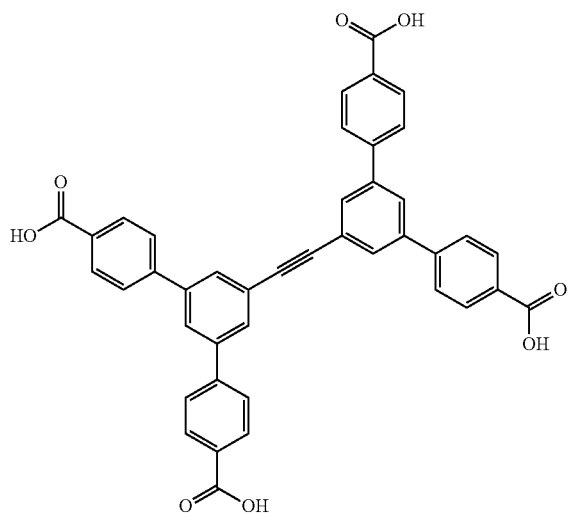 [SMILES: O=C(O)c1ccc(-c2cc(C#Cc3cc(-c4ccc(C(=O)O)cc4)cc(-c4ccc(C(=O)O)cc4)c3)cc(-c3ccc(C(=O)O)cc3)c2)cc1]

FIG. 1D illustrates a ball-and-stick structure 200' and a polyhedral representation 200'' of a suitable M-soc-MOF 200 comprised of a plurality of 6-connected TMBBs 201 networked by organic tetradentate planar ligands 202. In FIG. 1D, hydrogen atoms, water molecules, and [NO$_3$]-ions are omitted for clarity. One example M-soc-MOF 200 can be described as [In$_3$O(C$_{16}$N$_2$O$_8$H$_6$)$_{1.5}$(H$_2$O)$_3$](H$_2$O)$_3$(NO$_3$). All such M-soc-MOFs are characterized by an soc-topology, and can generally be denoted as M-soc-MOFs. The soc-topology of M-soc-MOF 200 provides unique structure features, including the presence of isolated nanometer-scale carcerand-like capsules, which anchor nitrate ions, and which are strictly accessible through the two main channels by very restricted windows. Such characteristics provide high, localized charge density advantageous for chemical and physical sorption of compounds.

Other interesting structural features of the crystalline structure are its two types of infinite channels. The first type is hydrophilic, due to the water molecules coordinated to the indium centers which are pointed inside these channels. Guest water molecules occupy the remaining free volume in these channels and form hydrogen bonds with coordinated water molecules. The second type of channels can be guest free, and have an approximately 1 nm diameter.

M-soc-MOFs can have a BET surface area of at least about 800 m$^2$/g, at least about 900 m$^2$/g, at least about 1,000 m$^2$/g, at least about 1,200 m$^2$/g, at least about 1,400 m$^2$/g, or at least about 1,600 m$^2$/g. In a specific embodiment, an M-soc-MOF has a BET surface area of at least about 800 m$^2$/g. In a specific embodiment, an M-soc-MOF has a BET surface area of about 1,000 m$^2$/g. In a specific embodiment, an M-soc-MOF has a BET surface area of about 1,000 m$^2$/g to about 1,600 m$^2$/g.

M-soc-MOFs can have an average pore volume of at least about 0.2 cm$^3$/g, at least about 0.25 cm$^3$/g, at least about 0.3 cm$^3$/g, at least about 0.45 cm$^3$/g, at least about 0.6 cm$^3$/g, or at least about 0.65 cm$^3$/g. In a specific embodiment, an M-soc-MOF has an average pore volume of at least about 0.2 cm$^3$/g. In a specific embodiment, an M-soc-MOF has an average pore volume of about 0.3 cm$^3$/g. In a specific embodiment, an M-soc-MOF has an average pore volume of about 0.3 cm$^3$/g to about 0.65 cm$^3$/g.

Figure 1E:
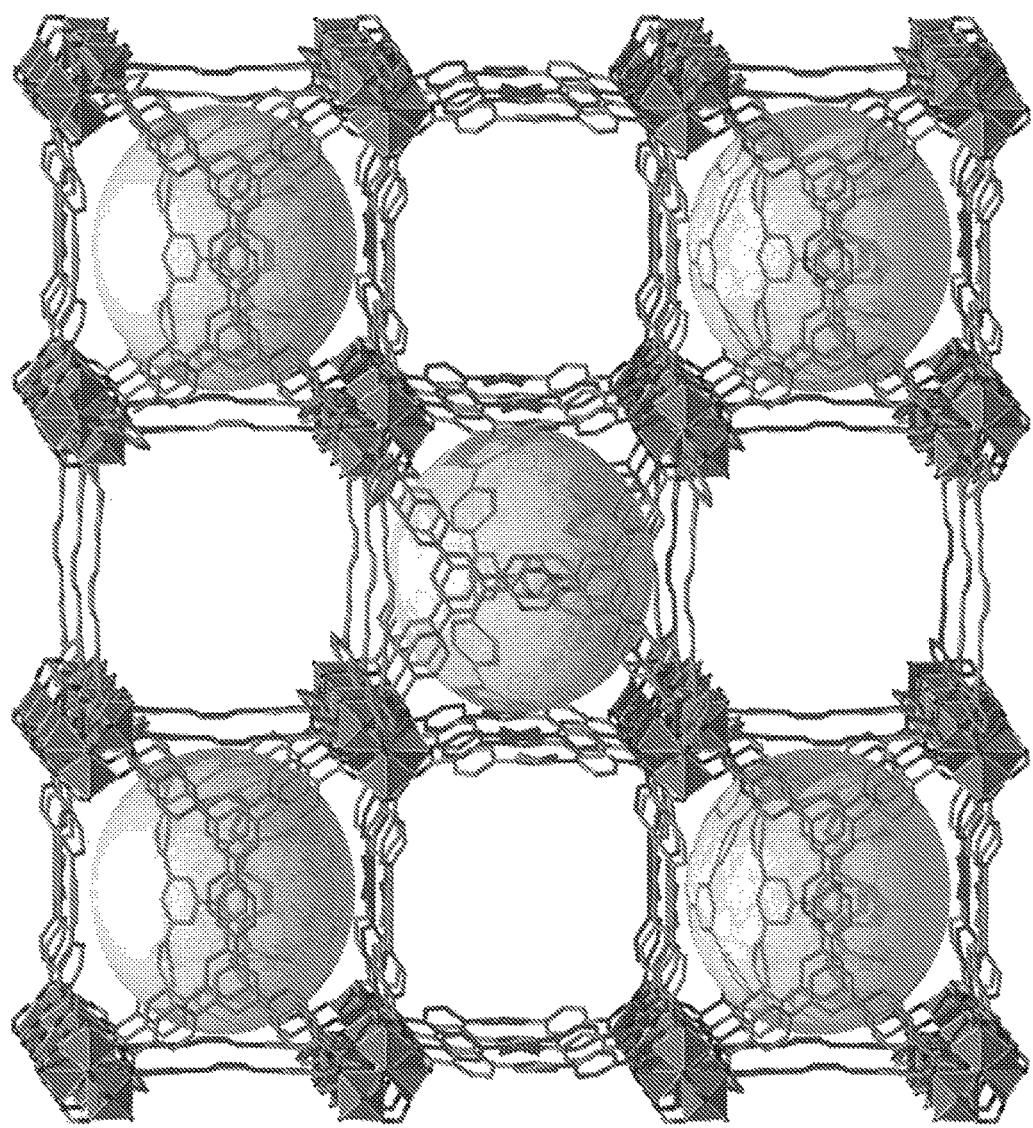
FIG. 1E illustrates a perspective view of a square-octahedral molecular organic framework cage and network, according to one or more embodiments of this disclosure.
Figure 1F:
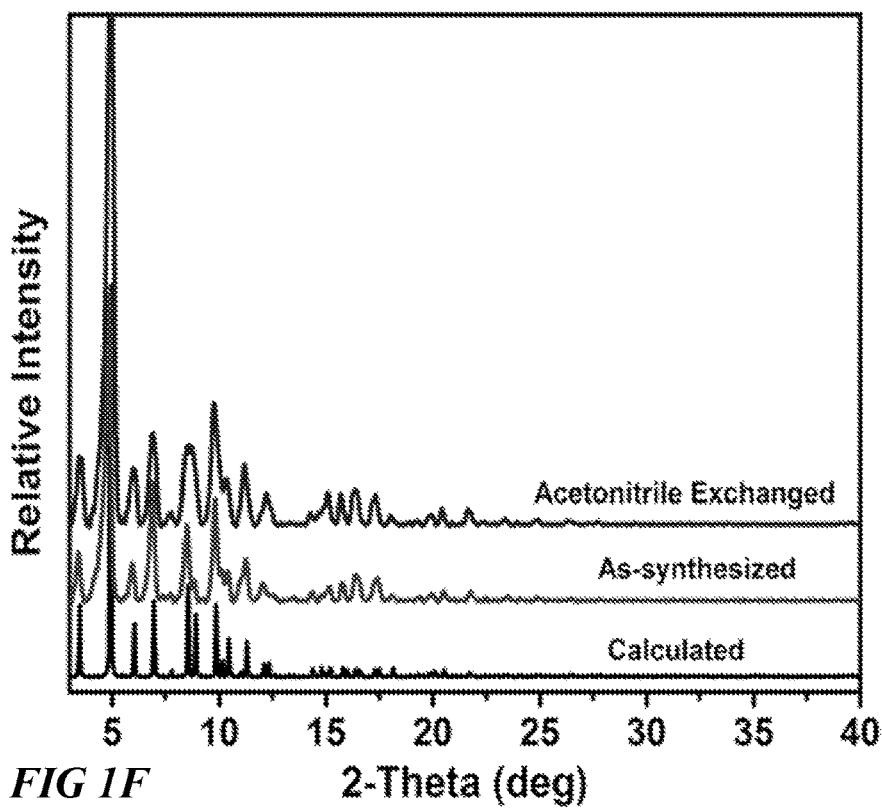
FIG. 1F illustrates a X-ray diffraction data for a square-octahedral molecular organic framework, according to one or more embodiments of this disclosure.

In one embodiment, a representative MOF unit cell comprises a plurality of aluminum components networked with a plurality of ligand components. For example, the MOF unit cell can comprise soc topology, having 8 6-connected aluminum components and 6 4-connected ligands. In some embodiments the aluminum components are aluminum trimers. In some particular embodiments the aluminum trimer is a μ3-oxo-centered trimer of octahedral AlO$_6$. In some embodiments the ligand component is a quadrangular ligand. In some particular embodiments the ligand component is a 3,3'',5,5''-tetrakis(4-carboxyphenyl)-p-terphenyl (TCPT) tetratopic ligand, which can act as a rectangular MBB. Accordingly, a representative MOF unit cell can comprise 8 AlO$_6$ trimers networked with 6 TCPT ligands. This Al-soc-MOF-2 unit cell is characterized by a cubic shaped cage defined by the AlO$_6$ trimers at the corners and the ligands occupying the faces of the cage, resulting in a soc-a network topology as shown in FIG. 1D. This Al-soc-MOF-2 unit cell can have one or more of a diameter of about 14.3 Å, apertures measuring about 9 Å (considering vdW radii), and two well-defined 1D infinite channels about 14 Å. When such unit cells are agglomerated, the 1D infinite channels can approximately reach the border of the microporous materials, as shown in FIG. 1E. The Langmuir surface area for the Al-soc-MOF-2 architecture was estimated to be ca. 7118 m$^2$/g, with a pore volume of 2.3 cm$^3$/g. Al-soc-MOF-2 unit cells can be synthesized by reacting TCPT and AlCl$_3$.6H$_2$O in an N,NDMF/CH$_3$CN/HNO$_3$ solution. Such a reaction yields pure phase cube-shaped crystals as shown in the powder X-ray diffraction pattern of FIG. 1F, which can be represented by [Al$_3$(C$_{66}$O$_8$H$_{26}$)$_{1.5}$(H$_2$O)$_3$].(Cl).

Altering the ligands of the Al-soc-MOF-2 embodiment can provide various isoreticulars having similar topologies and thus similarly useful physical properties. In one embodiment, the phenyl ring located in the core of the TCPT ligand can be substituted by (1,4-substituted) naphthalene to provide the naphthalene functionalized ligand 3',3'',5',5''-tetrakis(4-carboxyphenyl)-1,4-diphenylnaphthalene (TCDPN). The TCDPN ligand can be networked with aluminum trimers as in the Al-soc-MOF-2 embodiment to provide a Naphth-Al-soc-MOF-2 isoreticular. In another embodiment, the phenyl ring located in the core of the TCPT ligand can be substituted by (9,10-substituted) anthracene to provide the anthracene functionalized ligand 3',3'',5',5''-tetrakis(4-carboxyphenyl)-9,10-diphenylanthracene (TCDPA). The TCDPA ligand can be networked with aluminum trimers as in the Al-soc-MOF-2 embodiment to provide an Anth-Al-soc-MOF-2 isoreticular.

The Langmuir surface area for the Naphth-Al-soc-MOF-2 and Anth-Al-soc-MOF-2 architectures were estimated to be ca. 6300 m$^2$/g and 5350 m$^2$/g, respectively. Naphth-Al-soc- MOF-2 and Anth-Al-soc-MOF-2 architectures have pore volumes of 2.1 cm$^3$/g and 1.8 cm$^3$/g, respectively.

Naphth-Al-soc-MOF-2 and Anth-Al-soc-MOF-2 unit cells can each be synthesized by reacting TCDPN and TCDPN, respectively, with AlCl$_3$.6H$_2$O in an N,NDMF/CH$_3$CN/HNO$_3$ solution. Such a reaction yields homogeneous cube-shaped crystals which can each be represented by [Al$_3$(Ligand)$_{1.5}$(H$_2$O)$_3$].(Cl).

Figure 2A:
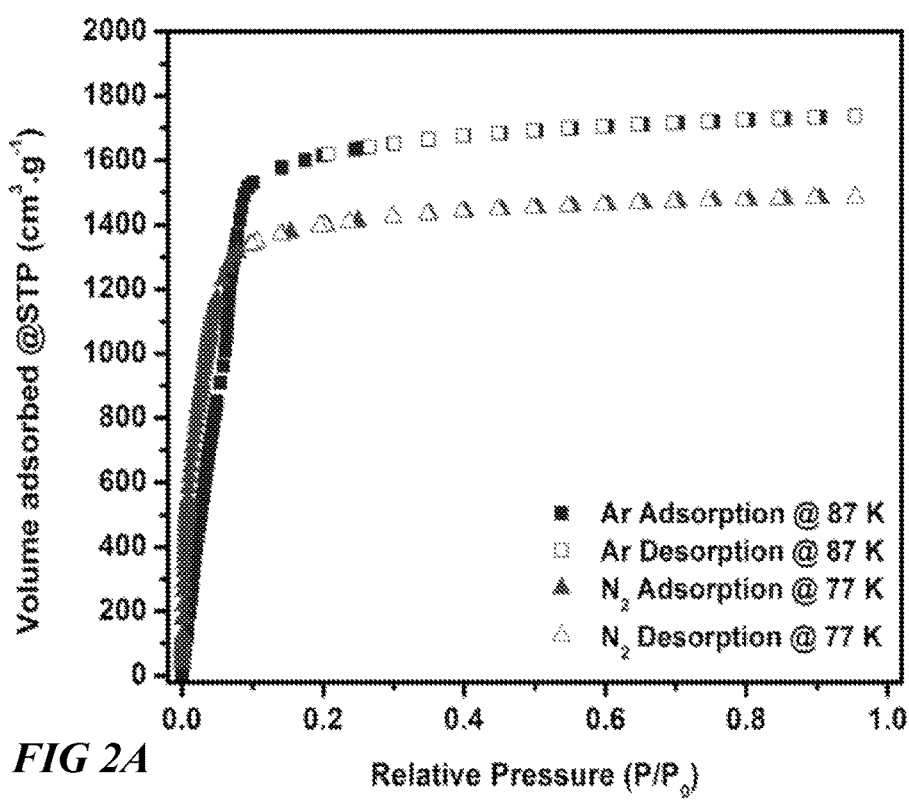
FIG. 2A illustrates gaseous adsorption isotherms for square-octahedral molecular organic frameworks, according to one or more embodiments of this disclosure.
Figure 2B:
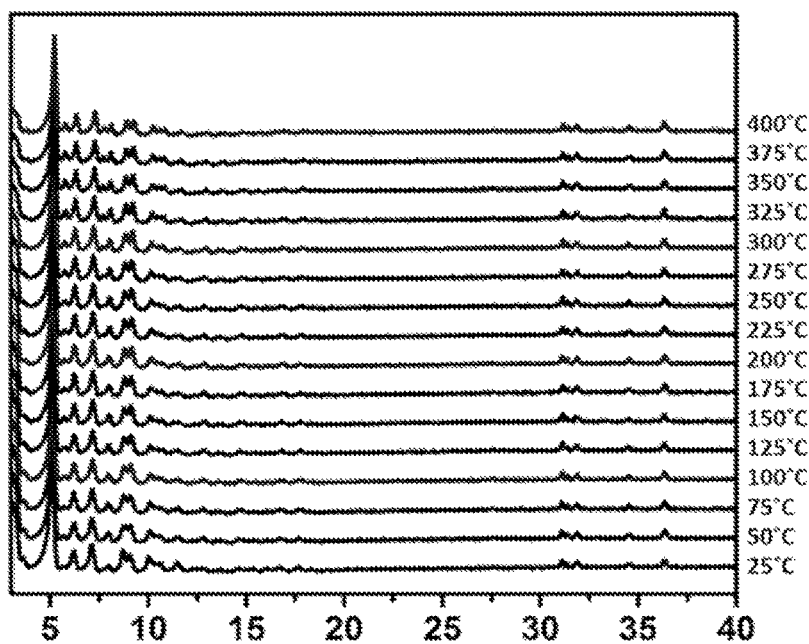
FIG. 2B illustrates thermal stability data for square-octahedral molecular organic frameworks, according to one or more embodiments of this disclosure.

Al-soc-MOF architectures provided herein, including Al-soc-MOF-2, Naphth-Al-soc-MOF-2, and Anth-Al-soc-MOF-2 architectures, exhibit type-I adsorption isotherms which are fully reversible. This quality is representative of porous materials with permanent microporosity. For example, as shown in FIG. 2A, adsorption isotherms for nitrogen (at 77K) and argon (at 87K) are given for Al-soc-MOF-2. Indeed, the Al-soc-MOF architectures provided herein exhibit high resistance to pore collapse and high thermal stability. This permanent microporosity is demonstrated by harmonized experimental and optimal theoretical values for pore volume on each Al-soc-MOF architecture, which indicates no or minimal pore collapse during sample activation under vacuum. Such a feature is advantageous in that highly porous MOF architectures typically collapse under vacuum. Further, the Al-soc-MOF architectures provided herein preserve their optimal porosity on heating up to 360° C. under vacuum, a feature rarely observed for highly porous MOFs. As shown in FIG. 2B, the high thermal stability was verified using variable temperature powder X-ray diffraction studies (VT-PXRD. It can be seen that Al-soc-MOF-2 architectures retain crystallinity up until at least 400° C.

Figure 3A:
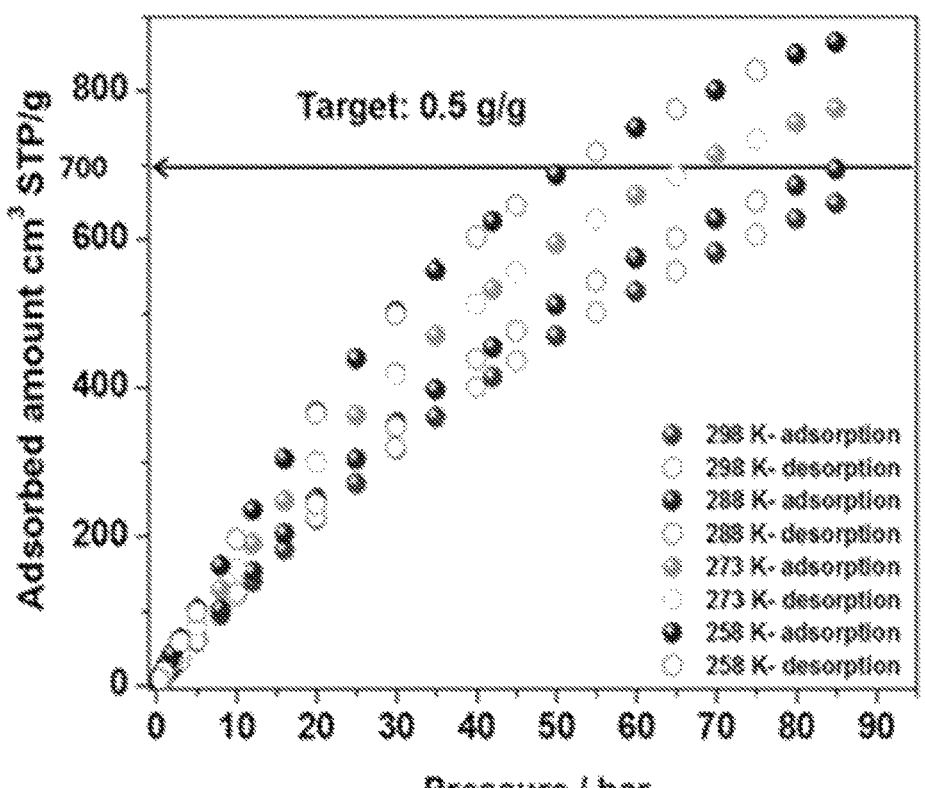
FIG. 3A illustrates absolute gravimetric adsorption uptakes of methane for a square-octahedral molecular organic framework, according to one or more embodiments of this disclosure.
Figure 3B:
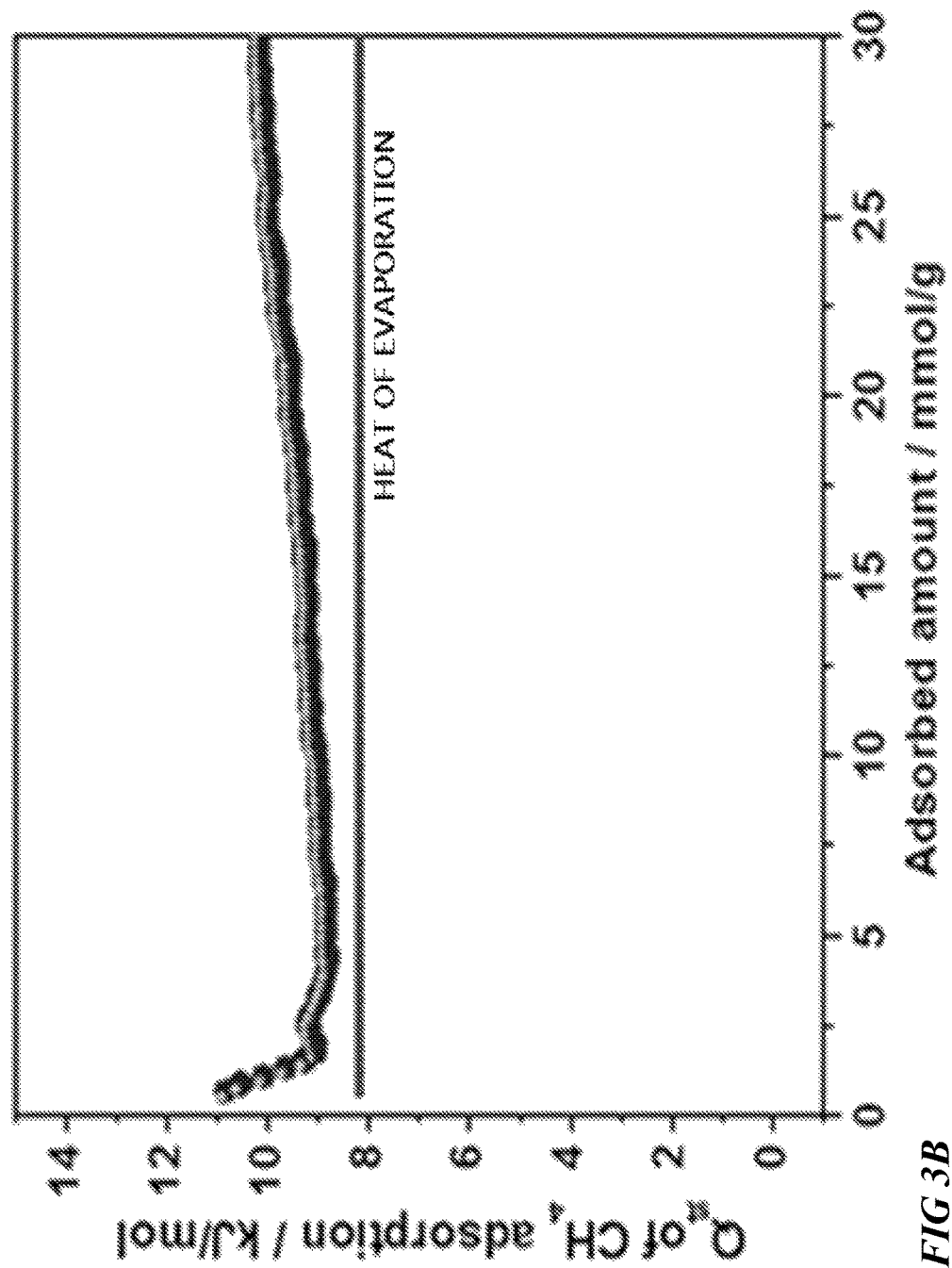
FIG. 3B illustrates isosteric heat of adsorption for square-octahedral molecular organic frameworks, according to one or more embodiments of this disclosure.

Methane storage capabilities for the Al-soc-MOF architectures provided herein is illustrated in FIG. 3A, wherein the absolute gravimetric adsorption uptakes of CH$_4$ for various Al-soc-MOF-2 isotherms are given over a range of pressures up to 85 bar. As shown, the Al-soc-MOF-2 architecture exhibits the highest ever CH$_4$ gravimetric uptakes (ca. 361 cm$^3$/g) for MOFs at the standard conditions (298 K and 35 bar). The DOE CH$_4$ gravimetric uptake target of 700 cm$^3$ STP/g (0.5g/g) was largely achieved for the Al-soc-MOF-2 isotherms below 288 K in the range of pressure between 50 (258 K) and 85 (288 K) bar. FIG. 3B shows isosteric heat of adsorption for Al-soc-MOF-2.

Figure 4:
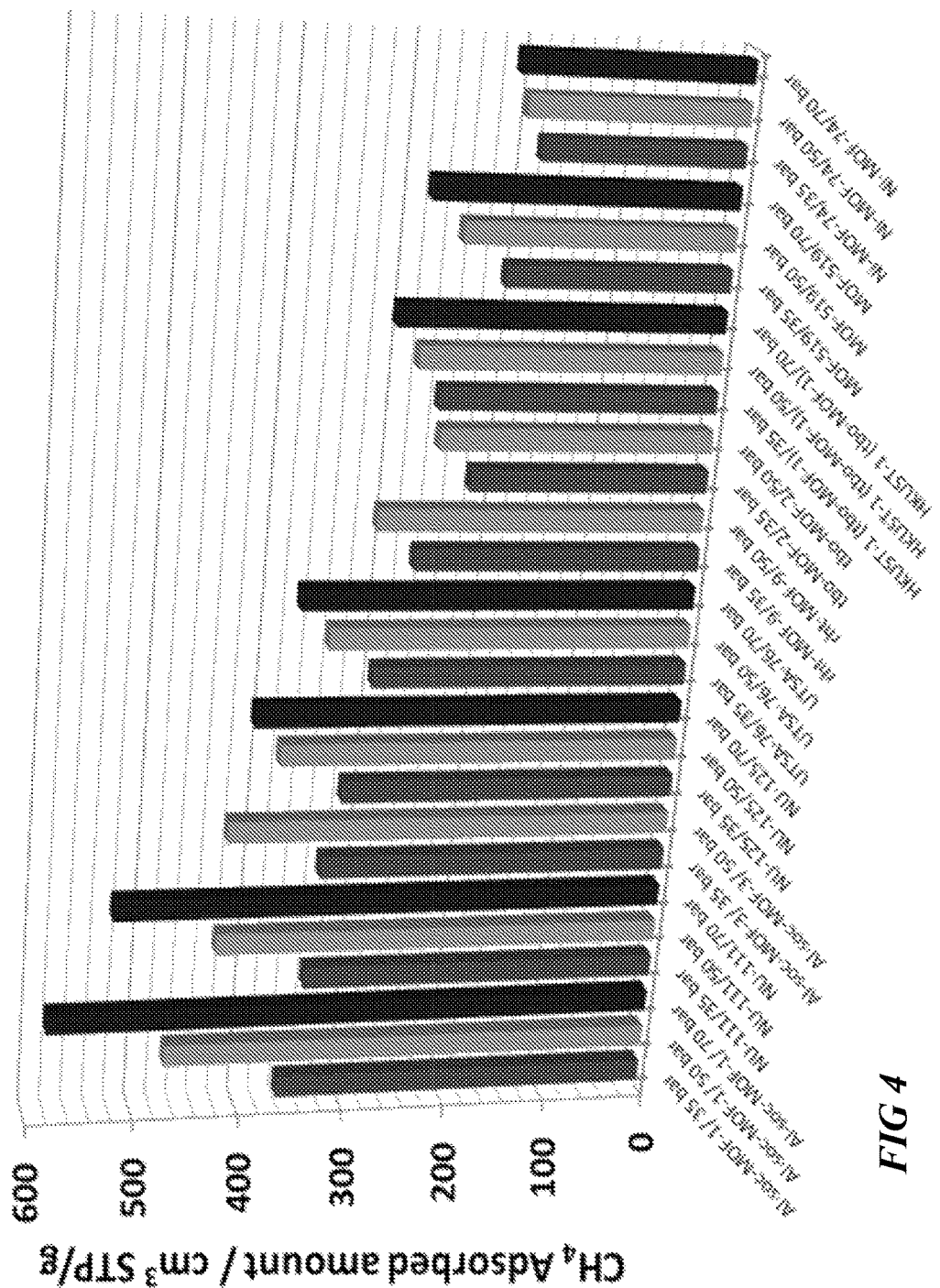
FIG. 4 illustrates adsorption gravimetric uptake of methane for various MOF architectures, according to one or more embodiments of this disclosure.
Figure 5:
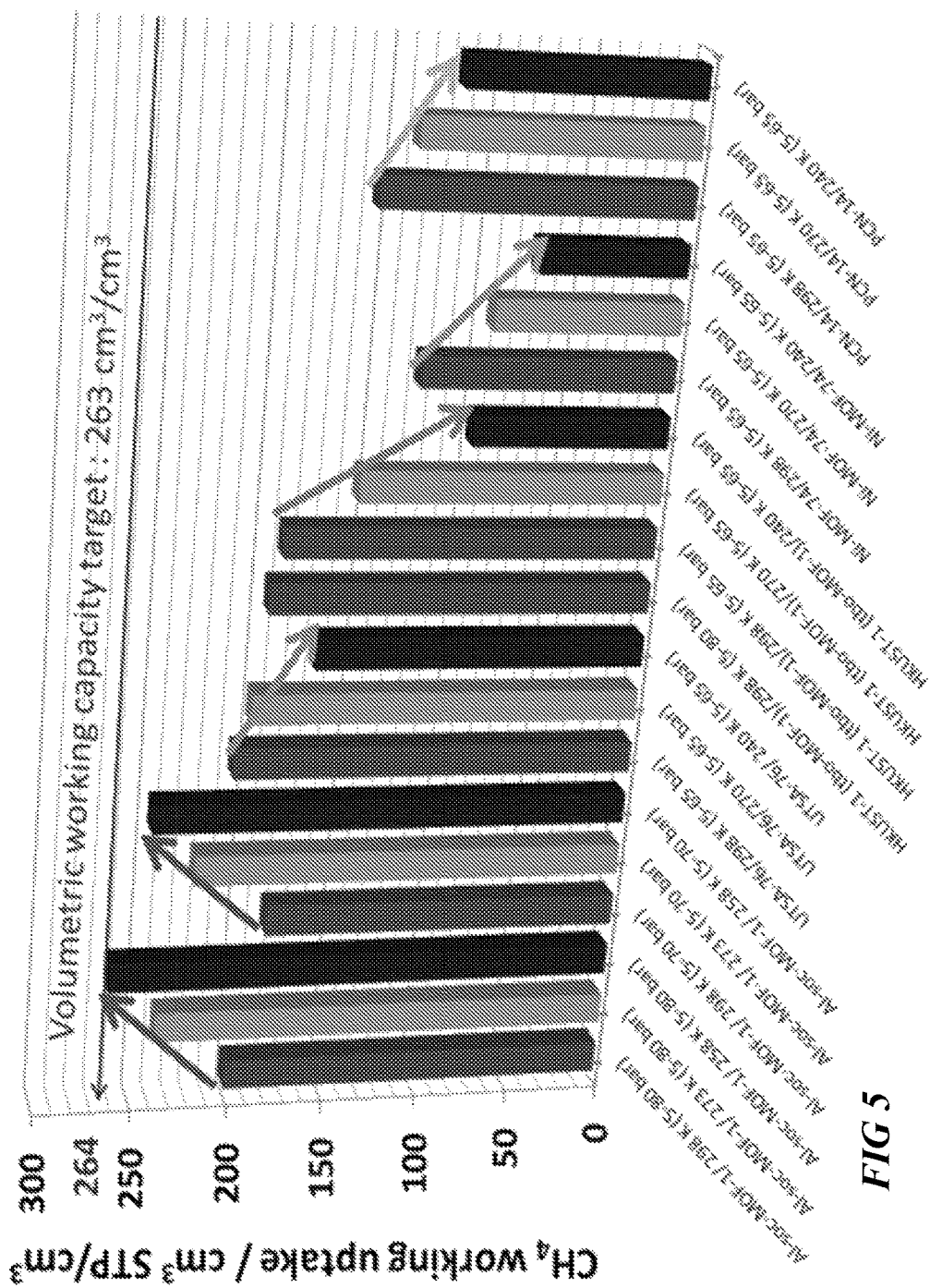
FIG. 5 illustrates adsorption volumetric working uptake of methane for various MOF architectures, according to one or more embodiments of this disclosure.

FIG. 4 shows that the Al-soc-MOF-2 architecture exhibits higher gravimetric uptakes at 35, 50 and 70 bar in comparison to competitive MOF materials in the same pressure conditions at 298 K. Further, FIG. 5 provides a deep analysis of the CH$_4$ storage capabilities at the volumetric scale which shows that Al-soc-MOF-2 exhibits increased working volumetric uptakes (from 201 to 264 cm3STP/cm$_3$) with decreasing temperature (from 298 to 258 K) in the pressure range between 5 bar (desorption) and 70-80 bar (adsorption). This in contrast to all known competitive MOF materials for CH$_4$ storage which exhibit a decreasing working CH$_4$ storage capacity trend with decreasing temperature for UTSA-76, HKUST-1, Ni-MOF-74 and PCN-14.

Without being held to a particular mechanism or theory, an explanation for the inverted working storage capacity trend for Al-soc-MOF-2 is the low unused CH$_4$ uptake below 5 bar and the linear trend of the CH$_4$ isotherms at high pressure, which is a desirable feature for gas storage media. In contrast to all known competitive MOFs, Al-soc-MOF-2 exhibits relatively low CH$_4$ heat of adsorption across the CH$_4$ loading range. As shown in FIG. 3B, the CH$_4$ heat of adsorption is only slightly higher than the CH$_4$ latent heat of evaporation across the loading range. The increasing interaction trend at high CH$_4$ loading can, in part, be explained by the multilayer adsorption induced by the promoted CH$_4$-CH$_4$ interaction at high pressure. The combined effects at low and high pressure are contributing factors for the increased CH$_4$ working uptakes during temperature reduction. It is important to mention that at 298 K and 5-80 pressure working range, Al-soc-MOF-2 exhibits the second highest working capacity (201 cm$^3$STP/cm$^3$) vs. 230 cm$^3$STP/cm$^3$ reported recently for MOF-519.

Figure 6A:
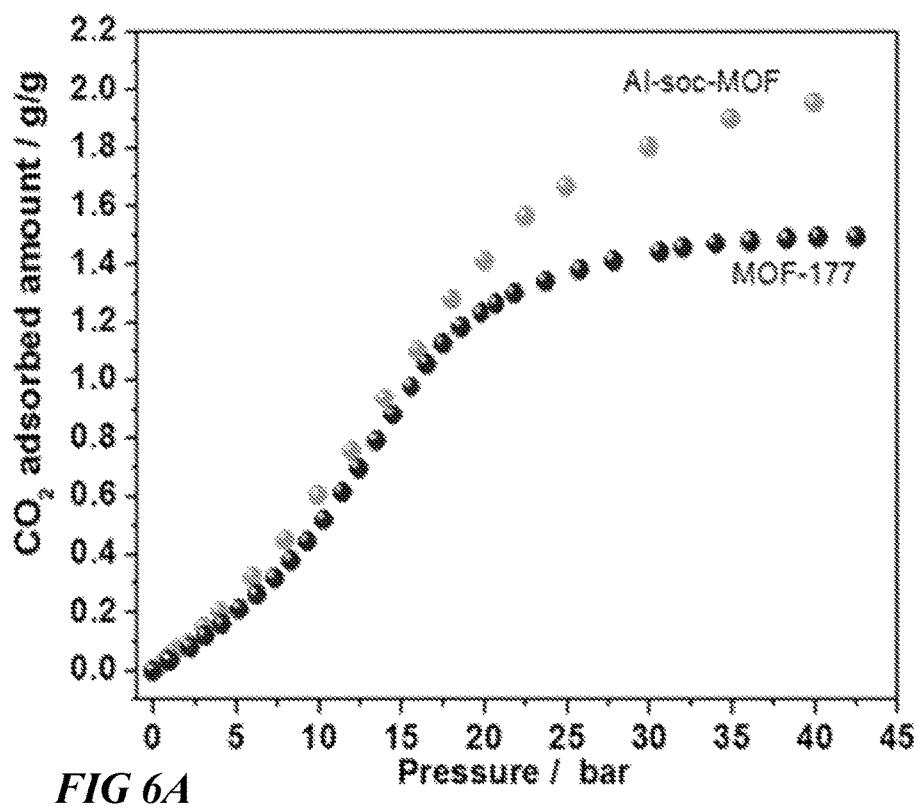
FIG. 6A illustrates absolute carbon dioxide adsorption isotherms for various MOF architectures, according to one or more embodiments of this disclosure.
Figure 6B:
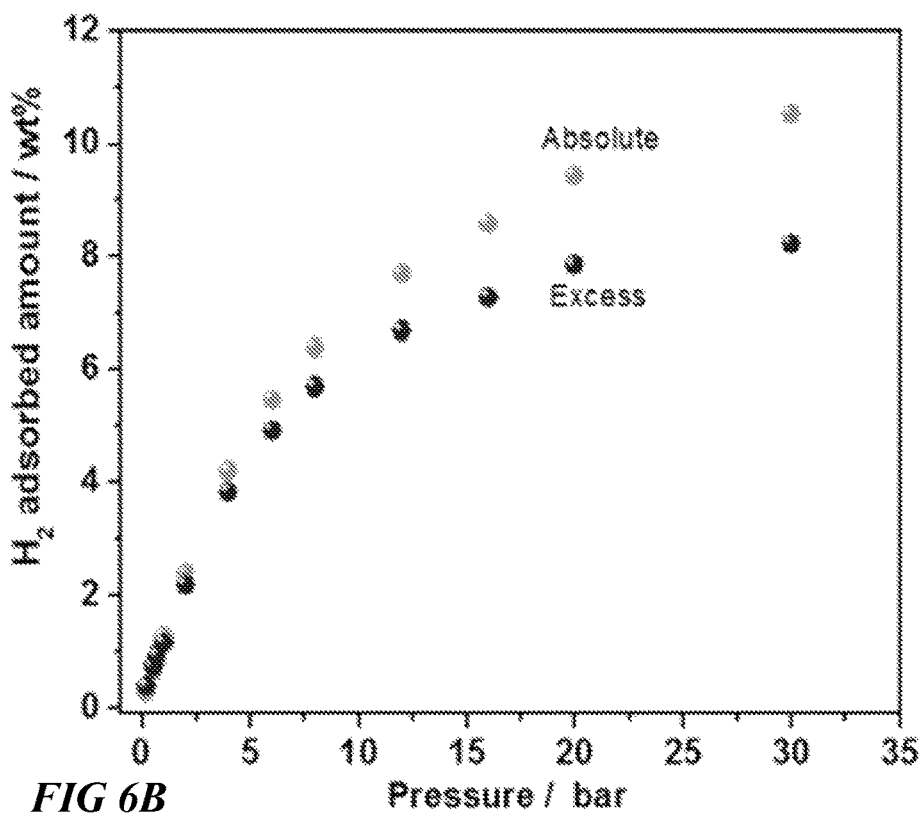
FIG. 6B illustrates excess and absolute hydrogen adsorption isotherms for various MOF architectures, according to one or more embodiments of this disclosure.
Figure 6C:
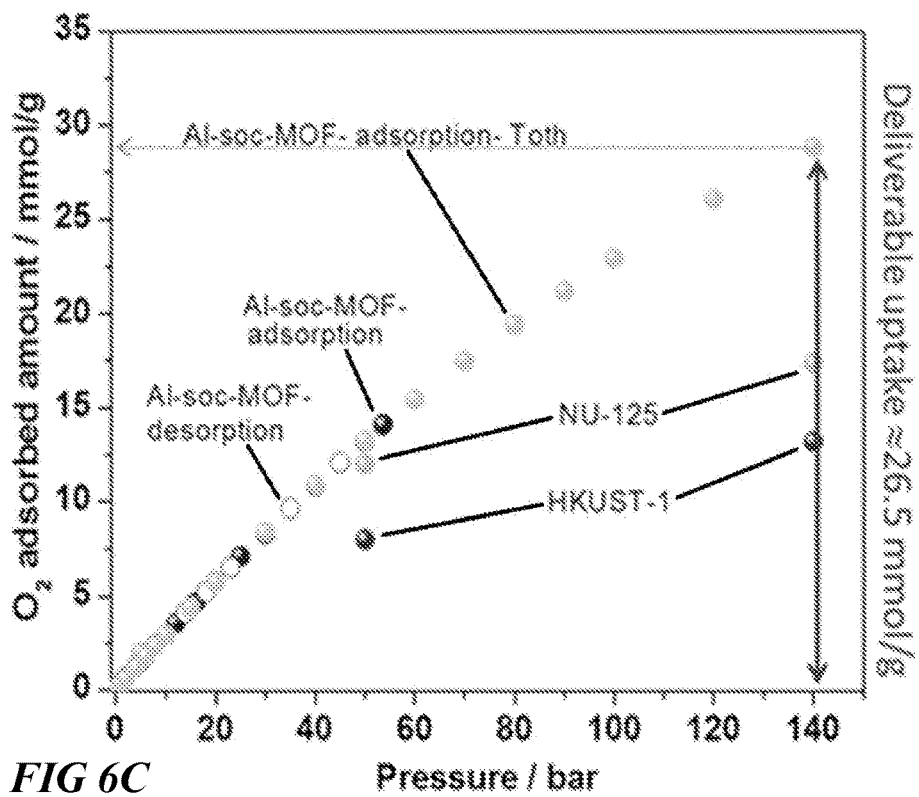
FIG. 6C illustrates absolute oxygen adsorption isotherms for various molecular organic framework architectures, according to one or more embodiments of this disclosure.

Storage capacity of Al-soc-MOF-2 was tested for other important commodities including O$_2$, CO$_2$ and other condensable light hydrocarbons (ethane (C$_2$H$_6$) propane (C$_3$H$_8$), n-butane (n-C$_4$H$_{10}$) and iso-butane (iso-C$_4$H$_{10}$)). FIGS. 6A-D illustrate Al-soc-MOF-2 gas adsorption performance. As shown in FIG. 6A, Al-soc-MOF-2 exhibited also a record ~2 g/g (1020 cm$^3$STP/g) of absolute gravimetric CO$_2$ uptake at 40 bar among microporous MOFs in comparison to the 1.5 g/g absolute gravimetric CO$_2$ uptake of MOF-177. Al-soc-MOF-2 exhibited a working capacity between 5 and 40 bar of 1.75 g/g (891 cm$^3$STP/g) as compared to the working capacity of 1.28 g/g (652 cm$^3$STP/g) for MOF-177. As shown in FIG. 6C, Al-soc-MOF-2 exhibits a record 29 mmol/g of absolute gravimetric O$_2$ uptake at 140 bar, which is considerably higher than competitive products HKUST-1 (13.2 mmol/g) and NU-125 (17.4 mmol/g). An impressive working capacity between 5 and 140 bar of 27.5 mmol/g is further demonstrated in FIG. 6C for the Al-soc-MOF-2 architecture, especially in comparison to the 11.8 and 15.4 mmol/g working capacities of HKUST-1 and NU-125, respectively.

Figure 6D:
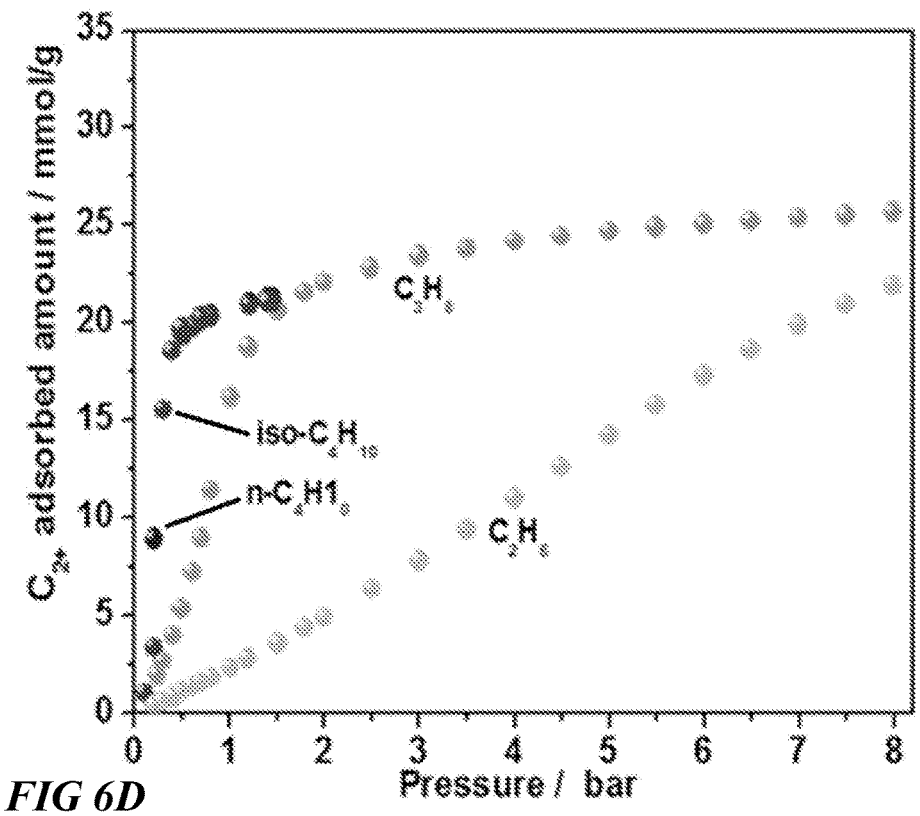
FIG. 6D illustrates absolute ethane, propane, n-butane and iso-butane adsorption isotherms for various molecular organic framework architectures, according to one or more embodiments of this disclosure.

Additionally, light hydrocarbons such as C$_2$H$_6$, C$_3$H$_8$, n-C$_4$H$_{10}$ and iso-C$_4$H$_{10}$ (referenced as R600a refrigerant) are excellent refrigerants and their combination with excellent highly porous adsorbents could enhance the cooling power in cooling in adsorption based chillers. As seen in FIG. 6D, Al-soc-MOF-2 exhibited the highest uptake for C$_2$H$_6$, C$_3$H$_8$, n-C$_4$H$_{10}$ and iso-C$_4$H$_{10}$ reported for microporous MOFs. In addition the complete desorption process of this refrigerant from the Al-soc-MOF-2 is possible at very mild conditions (298-323 K). Finally Al-soc-MOF-2 exhibit excellent H$_2$ storage at 77 K (ca. 11 wt %) in comparison to other existing highly porous materials.

Figure 7:
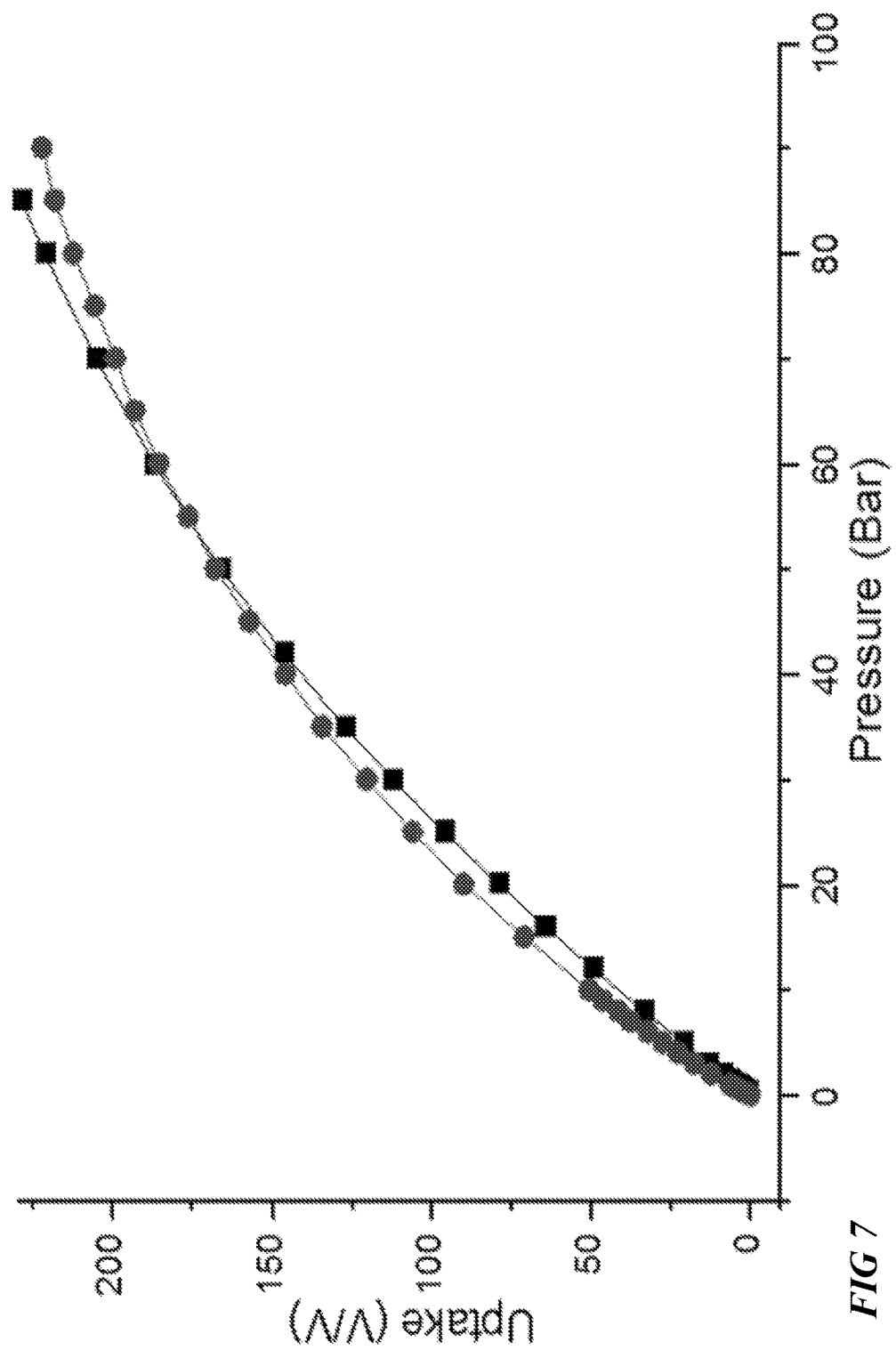
FIG. 7 illustrates experimental and simulated methane adsorption data, according to one or more embodiments of this disclosure.
Figure 8A:
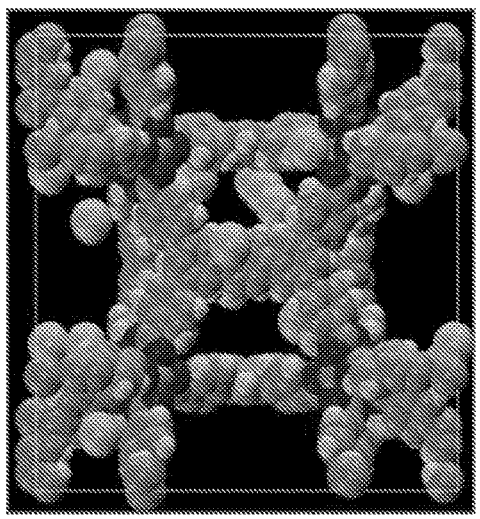
FIGS. 8A-C illustrate simulated screenshots of methane adsorption at various pressures, according to one or more embodiments of this disclosure.
Figure 8B:
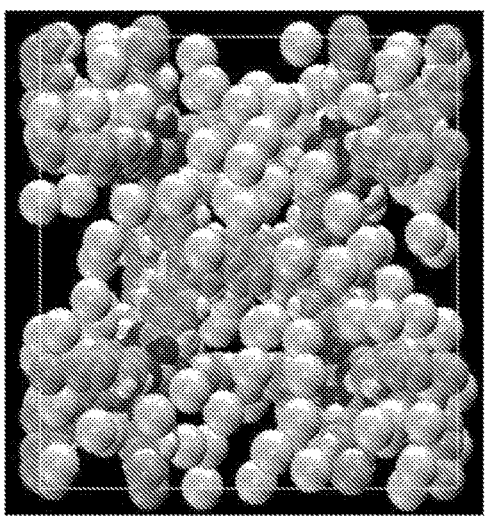
Figure 8C:
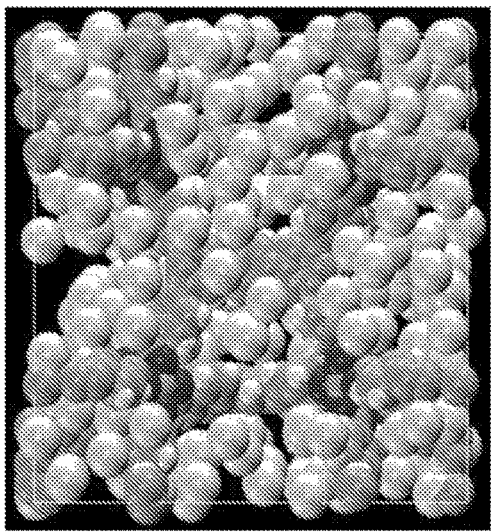
Figure 9A:
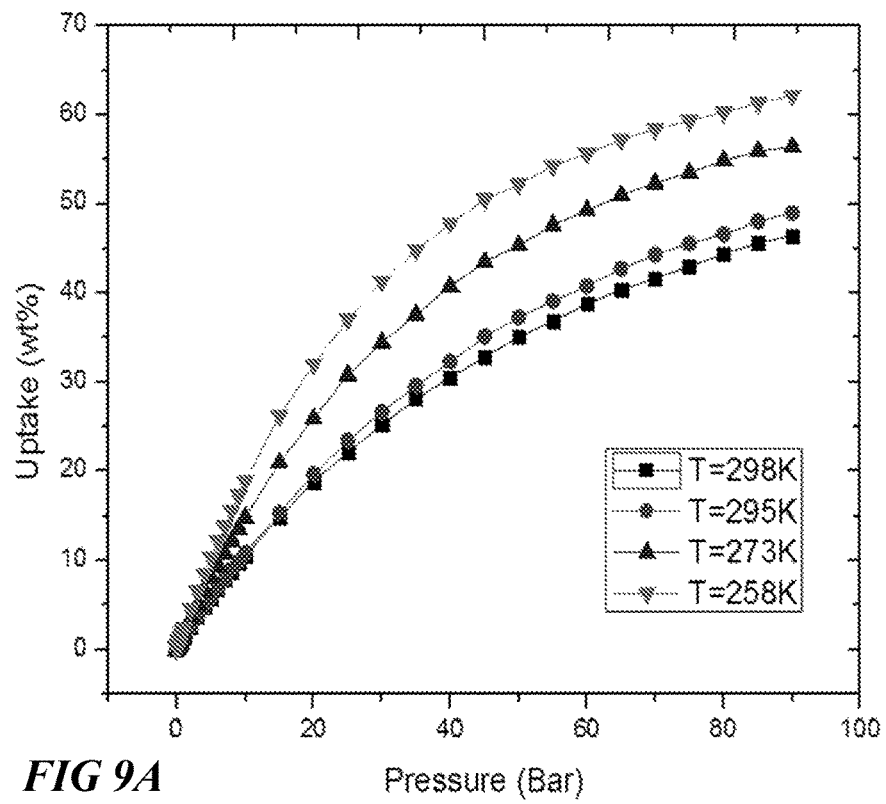
FIGS. 9A-B illustrate simulations of methane sorption at various temperatures, according to one or more embodiments of this disclosure.
Figure 9B:
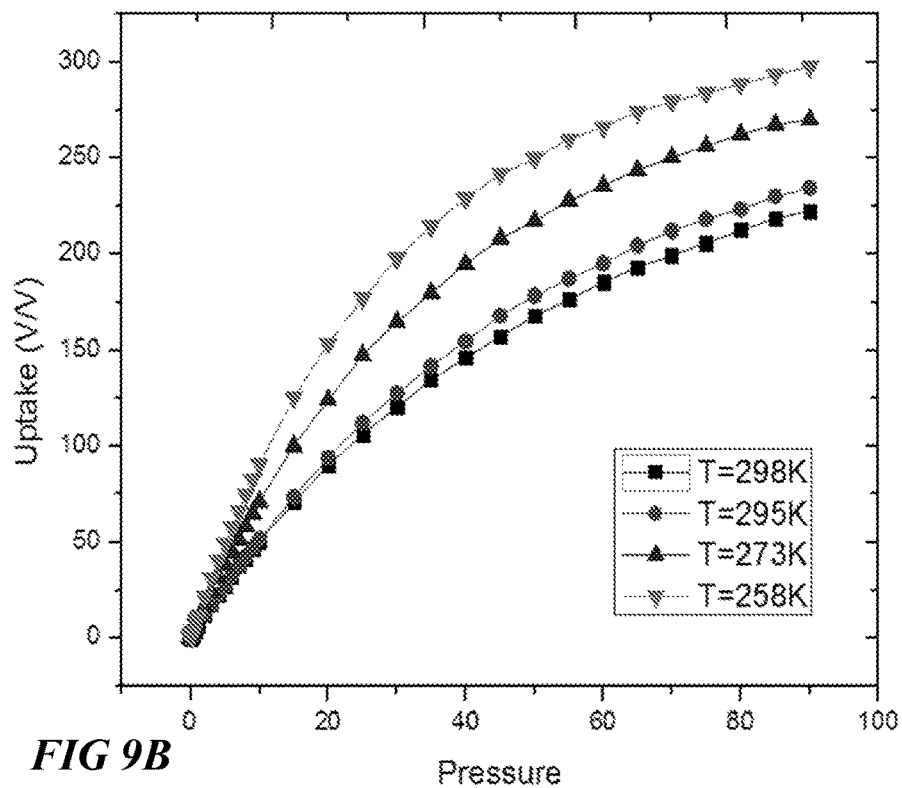

As shown in FIG. 7, an excellent agreement is observed between a CH$_4$ sorption GCMC simulation and experimental isotherms at 298 K. In FIG. 7, circles represent simulation data and squares represent experimental data. FIGS. 8A-C show simulation snapshots illustrating the adsorption of CH$_4$ in the Al-soc-MOF-2 pores at 5 bar, 35 bar, and 65 bar, respectively. In FIGS. 8A to 8B to 8C, an increased saturation of the Al-soc-MOF matrix by CH$_4$ molecules (light spheres) is observed. FIGS. 9A-B illustrate additional simulations of CH$_4$ sorption in Al-soc-MOF-2 at 298K, 295 K, 273 K, and 258 K, with results provided from both gravimetric and volumetric bases. The simulation data confirm the experimental results shown in FIG. 3A.

The Al-soc-MOF series embodiments presented above (i.e., Al-soc-MOF-2, Naphth-Al-soc-MOF-2, and Anth-Al-soc-MOF-2) are promising materials with potential use in gas storage and separation applications. When used as blueprint nets, these materials permit the construction of MOFs with interesting structural features having defined, porous, and highly accessible channels/cavities. The Al-soc-MOF-2 series showed extremely high gas storage density for H$_2$, CH$_4$, and CO$_2$. Any non-optimal porosity as exemplified from the intermediate surface area and pore volume exhibited by the Al-soc-MOF-2 series can be remedied in other embodiments through soc-MOF alteration strategies. Specifically, ligand components of soc-MOF embodiments can be altered to increase performance and physical attributes, such as accessible porosity. It is important to note that while increasing the surface area and pore volume of a porous material is important to enhancing $CH_4$ gravimetric uptakes, the volumetric working capacity is a crucial parameter to assess the material's performance towards $CH_4$ storage. It represents the usable amount of $CH_4$ deduced from subtracting the uptake at the delivery pressure (5 bar) from the uptake at the maximum adsorption pressure (35 bar or higher).

Figure 10:
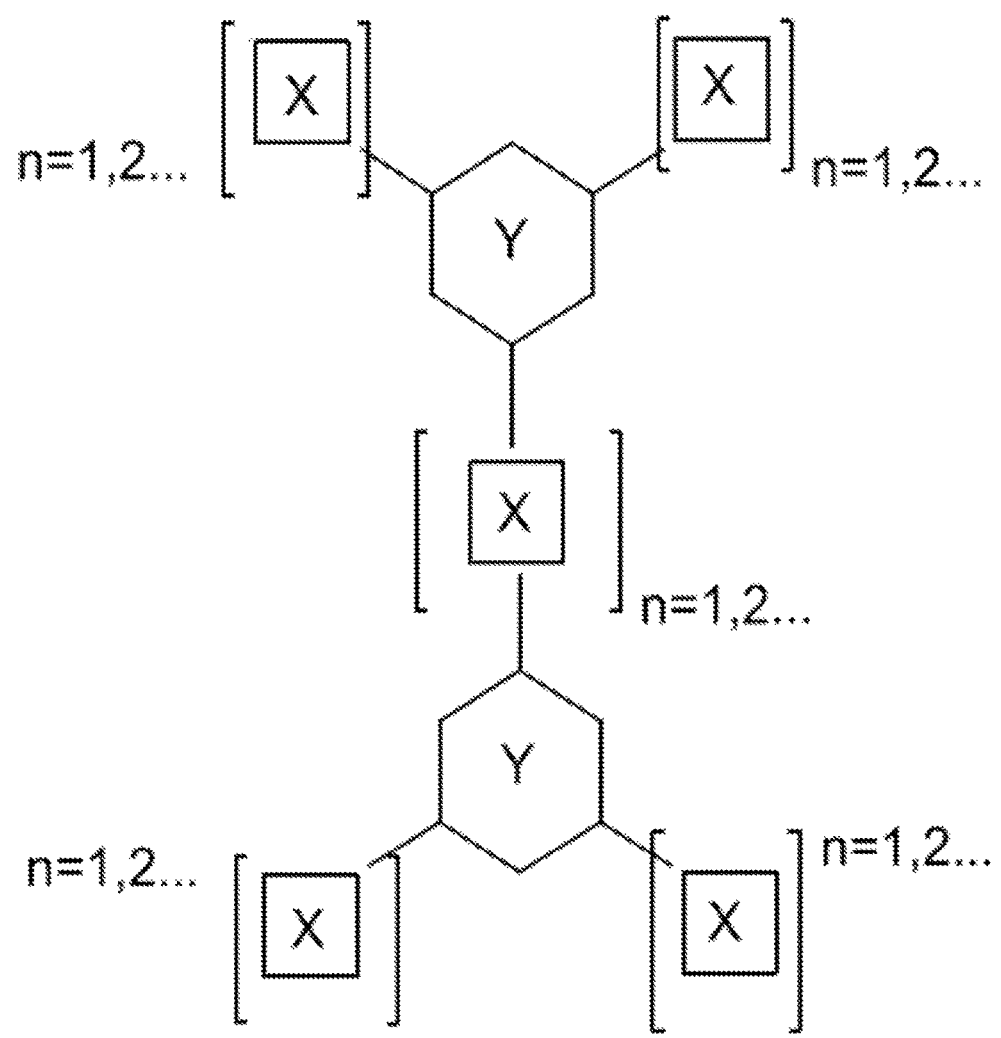
FIG. 10 illustrates a ligand modification strategy schematic, according to one or more embodiments of this disclosure.

The verified simulation methods discussed above were further utilized to alter ligand construction for overall Al-soc-MOF architecture performance optimization for storage of valuable commodities such as $CH_4$, $H_2$, $CO_2$ and $O_2$. Ligand alteration can include elongation and contraction of ligands through removal or addition of constituent groups. Ligand alteration can additionally or alternatively include replacing one or more ligand constituents. In one embodiment, ligand alteration includes replacing one or more representative X constituents with 2 or more constituent groups. As shown in FIG. 10, a representative ligand for Al-soc-MOF provided herein comprises 7 core constituent groups, labeled either X or Y. In one embodiment, the Y constituent group of the representative ligand can comprise an aryl or heteroaryl constituent. In one embodiment, the X constituent group of the representative ligand can comprise an aryl, functionalized aryl (R-aryl, R=n-$CH_2$, $CF_3$, Br, Cl, etc.), polyaryl, heteroaryl, or alkyne constituent. Ligand alteration is applicable to aluminum, iron, gallium, indium, vanadium, chromium, titanium, and scandium soc-MOF analogues.

Figure 11:
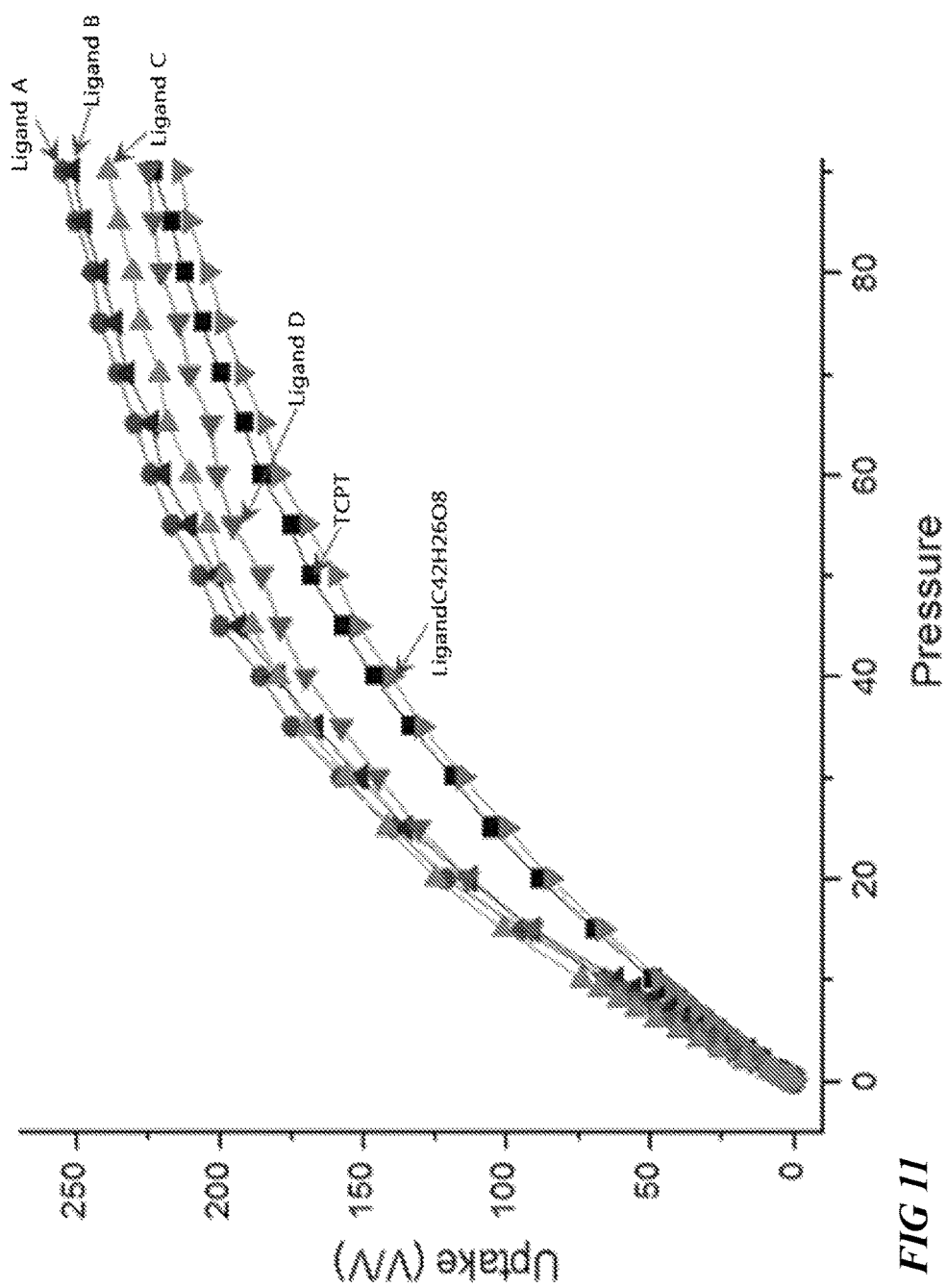
FIG. 11 illustrates simulated adsorption isotherms for various isostructural metal organic frameworks, according to one or more embodiments of this disclosure.
Figure 12:
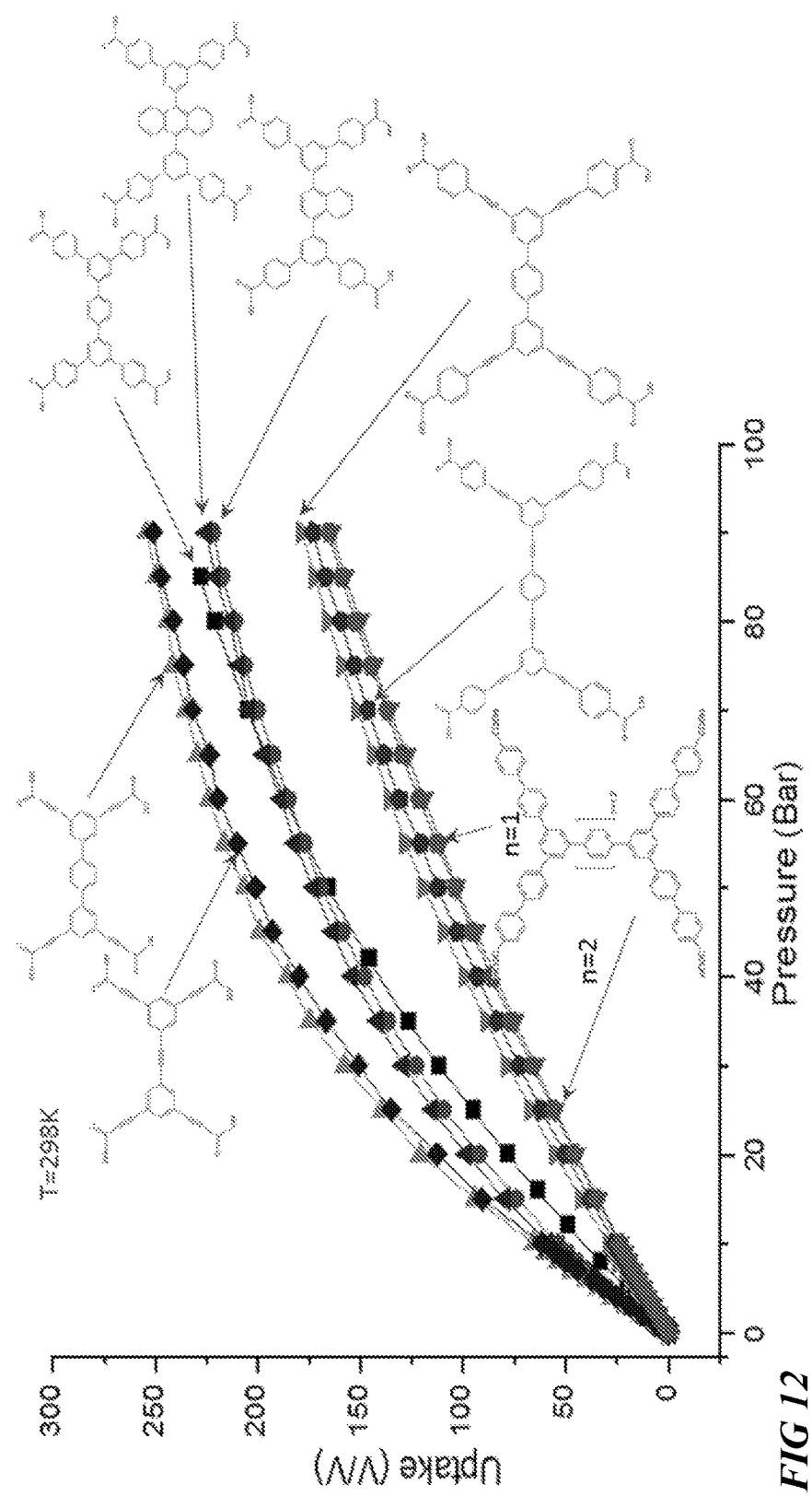
FIG. 12 illustrates simulated adsorption isotherms for various isostructural metal organic frameworks, according to one or more embodiments of this disclosure.

$CH_4$ adsorption for Al-soc-MOF embodiments with ligands altered using the strategy illustrated in FIG. 10 was calculated using GCMC simulations. FIG. 11 and FIG. 12 illustrate simulated CH4 adsorption isotherms and working capacities for various isostructural Al-soc-MOFs. In FIG. 11, the working capacities of 3,3',3",3'''-([1,1':4',1"-terphenyl]-3,3",5,5"-tetra)tetra propionic acid (denoted Ligand A in FIG. 11), 3,3',3",3'''-(ethyne-1,2-diylbis(benzene-5,1,3-triyl))tetrapropiolic acid (denoted Ligand B in FIG. 11), 3,3',3",3'''-(ethyne-1,2-diylbis(2,4,6-trimethylbenzene-5,1,3-triyl))tetrapropiolic acid (denoted Ligand C in FIG. 11), 3,3',3",3'''-(2',3',5',6'-tetramethyl-[1,1':4',1"-terphenyl]-3,3",5,5"-tetrayl)tetrapropiolic acid (denoted Ligand D in FIG. 11), TCPT, and Ligand$C_{42}H_{26}O_8$ were measured across a range of pressures to determine a relation between working capacity and the distance between the X moieties (shown in FIG. 10). The same strategy was followed with additional tetracarboxylate ligands as shown in FIG. 11. The results shown in FIGS. 10-11 show that working volumetric capacity can be enhanced by shortening the distance between the X moieties. Such an alteration creates isostructural Al-soc-MOFs with slightly lower porosity but shifted isotherms curvatures which indicate higher capacity at lower pressures. In contrast, increasing the distance in X-branches or X-core moieties led to other isostructural Al-soc-MOFs with enhanced gravimetric uptake but with much lower volumetric capacity.

Figure 13:
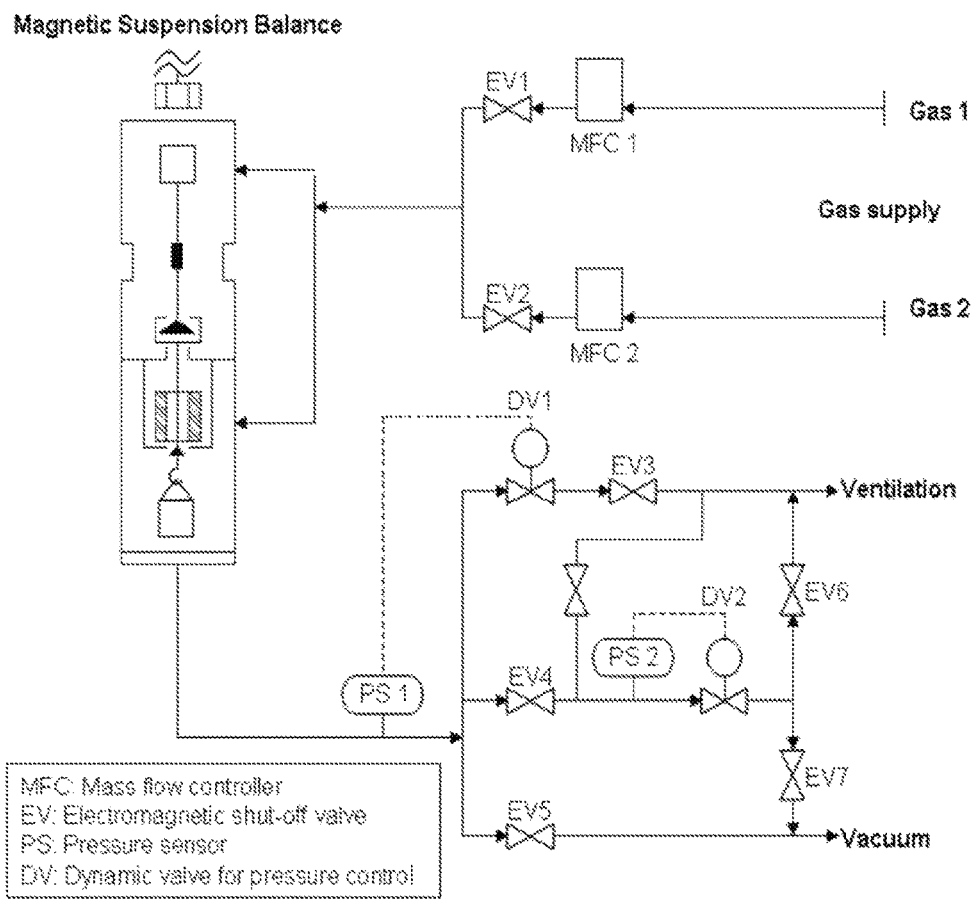
FIG. 13 illustrates a Rubotherm gravimetric-densimetric apparatus schematic, according to one or more embodiments of this disclosure.

Adsorption equilibrium measurements of pure gases (i.e., $CO_2$, $CH_4$, $H_2$, $C_2H_6$, $C_3H_8$ and n-$C_4H_{10}$) was performed using a Rubotherm gravimetric-densimetric apparatus (Bochum, Germany) as shown in FIG. 13, comprising a magnetic suspension balance (MSB) and a network of valves, mass flowmeters and temperature and pressure sensors. The MSB overcomes the disadvantages of other commercially available gravimetric instruments by separating the sensitive microbalance from the sample and the measuring atmosphere and is able to perform adsorption measurements across a wide pressure range, i.e. from 0 to 20 MPa. The adsorption temperature may also be controlled within the range of 77 K to 423 K. In a typical adsorption experiment, the adsorbent is precisely weighed and placed in a basket suspended by a permanent magnet through an electromagnet. The cell in which the basket is housed is then closed and vacuum or high pressure is applied. The gravimetric method allows the direct measurement of the reduced gas adsorbed amount. Correction for the buoyancy effect is required to determine the excess and absolute adsorbed amount using equations 1 and 2, where $V_{adsorbent}$ and $V_{ss}$ and $V_{adsorbed}$ phase refer to the volume of the adsorbent, the volume of the suspension system and the volume of the adsorbed phase, respectively.

$$\Omega = m_{absolute} - \rho_{gas}(V_{absorbent} + V_{ss} + V_{adsorbed\text{-}phase}) \quad (1)$$

$$\Omega = m_{excess} - \rho_{gas}(V_{adsorbent} + V_{ss}) \quad (2)$$

The buoyancy effect resulted from the adsorbed phase maybe taken into account via correlation with the pore volume or with the theoretical density of the sample. These volumes are determined using the helium isotherm method by assuming that helium penetrates in all open pores of the materials without being adsorbed. The density of the gas is determined using Refprop equation of state (EOS) database and checked experimentally using a volume-calibrated titanium cylinder. By weighing this calibrated volume in the gas atmosphere, the local density of the gas is also determined. Simultaneous measurement of adsorption capacity and gas phase density as a function of pressure and temperature is therefore possible.

The pressure is measured using two Drucks high pressure transmitters ranging from 0.5 to 34 bar and 1 to 200 bar, respectively, and one low pressure transmitter ranging from 0 to 1 bar. Prior to each adsorption experiment, about 200 mg of sample is outgassed at 473 K at a residual pressure 10-6 mbar. The temperature during adsorption measurements is held constant by using a thermostated circulating fluid.

What is claimed is:

1. A method of removing one or more compounds from a fluid, the method comprising:
    contacting one or more metal organic framework (MOF) compositions with a fluid containing at least $O_2$, wherein each of the MOF compositions are represented by the formula: M-soc-MOF, wherein M is a metal and soc is a square-octahedral topology, and
    sorbing at least $O_2$ from the fluid, and
    storing the sorbed $O_2$.

2. The method of claim 1, wherein the metal comprises aluminum, gallium, indium, iron, scandium, titanium, chromium, or vanadium.

3. The method of claim 1, wherein the M-soc-MOF comprises tetradentate organic ligands.

4. The method of claim 3, wherein the tetradentate organic ligands comprise tetracarboxylate ligands.

5. The method of claim 1, wherein the M-soc-MOF comprises rectangular planar organic ligands.

6. The method of claim 1, wherein the M-soc-MOF comprises amidetetracarboxylate, 3,3',5,5'-azobenzenetetracarboxylate, TCPT, TCDPN, TCDPA, 2",3",5",6"-tetrabromo-5',5'''-bis(4-carboxyphenyl)-[1,1':3',1":4",1''':3''',1''''-quinquephenyl]-4,4''''-dicarboxylic acid, 2",3",5"-tribromo-5',5'''-bis(4-carboxyphenyl)-[1,1':3',1":4",1''':3''',1''''-quinquephenyl]-4,4''''-dicarboxylic acid, 2",5"-dibromo-5',5'''-bis(4-carboxyphenyl)-[1,1':3',1":4",1''':3''',1''''- quinquephenyl]-4,4''''-dicarboxylic acid, 2'',3''-dibromo-5', 5'''-bis(4-carboxyphenyl)-[1,1':3',1'':4'',1''':3''',1''''-quinquephenyl]-4,4''''-dicarboxylic acid, 5',5'''-bis(4-carboxyphenyl)-2''-(trifluoromethyl)-[1,1':3',1'':4'',1''':3''', 1''''-quinquephenyl]-4,4''''-dicarboxylic acid, 5',5'''-bis(4-carboxyphenyl)-2'',5''-bis(trifluoromethyl)-[1,1':3',1'':4'',1''':3''',1''''-quinquephenyl]-4,4''''-dicarboxylic acid, 3,3',3'',3'''-([1,1':4',1''-terphenyl]-3,3'',5,5''-tetrayl)tetrapropiolic acid, 3,3',3'',3'''-(ethyne-1,2-diylbis(benzene-5,1,3-triyl))tetrapropiolic acid, 3,3',3'',3'''-(2',3',5',6'-tetramethyl-[1,1':4',1''-terphenyl]-3,3'',5,5''-tetrayl)tetrapropiolic acid, 3,3',3'',3'''-(ethyne-1,2-diylbis(2,4,6-trimethylbenzene-5,1,3-triyl)) tetrapropiolic acid, 4,4',4'',4'''-([1,1':4',1''-terphenyl]-3,3'',5,5''-tetrayltetrakis(ethyne-2,1-diyl))tetrabenzoic acid, 4,4',4'',4'''-(((1,4-phenylenebis(ethyne-2,1-diyl))bis(benzene-5,1,3-triyl))tetrakis(ethyne-2,1-diyl))tetrabenzoic acid, 5'',5''''''-(1,4-phenylenebis(ethyne-2,1-diyl))bis(([1,1':4',1'':3'',1''':4''',1''''-quinquephenyl]-4,4''''-dicarboxylic acid)), 5'',5''''''-(1,4-phenylenebis([1,1':4',1'':3'',1''':4''',1''''-quinquephenyl]-4,4''''-dicarboxylic acid)), 0026BIS, 5,5'-(ethane-1,2-diyl) diisophthalic acid, (E)-5,5'-(diazene-1,2-diyl)diisophthalic acid, (E)-5,5'-(ethene-1,2-diyl)diisophthalic acid, 5,5'-(ethyne-1,2-diyl)diisophthalic acid, (Z)-1,2-bis(3,5-dicarboxyphenyl)diazene 1-oxide, 3,3''',5,5'''-tetrakis{4''''-(4''''-carboxy-[1'''',1'''''-biphenyl])}-1,1':4',1'':4'',1'''-quaterphenyl, or 4,4',4'',4'''-(1,4-phenylenebis(azanetriyl)) tetrabenzoic acid organic ligands.

7. The method of claim 1, wherein the M-soc-MOF comprises two distinct types of channels.

8. The method of claim 7, wherein one of the two types of channels is hydrophilic.

9. The method of claim 1, wherein the M-soc-MOF comprises a plurality of 6-connected trimer molecular building blocks networked by organic ligands.

10. The method of claim 9, wherein each of the trimer molecular building blocks comprises three metal carboxylate octahedra.

11. The method of claim 10, wherein each of the metal carboxylate octahedra of a trimer molecular building block are metal-centered and share one central $\mu_3$-oxo anion.

12. The method of claim 10, wherein the apical position of each metal carboxylate octahedra is occupied by a terminal water molecule.

13. The method of claim 1, wherein the M-soc-MOF has a BET surface area of at least 800 m$^2$/g.

14. The method of claim 1, wherein the M-soc-MOF has an average pore volume of at least 0.2 cm$^3$/g.

15. The method of claim 1, wherein contacting comprises mixing, bringing in close proximity, chemically contacting, physically contacting or combinations thereof.

16. The method of claim 1, wherein sorbing comprises adsorbing.

17. The method of claim 1, wherein sorbing comprises absorbing.

18. The method of claim 1, wherein the fluid comprises one or more of natural gas and biogas.

19. A method of removing one or more compounds from a fluid, comprising:
contacting a metal-organic framework (MOF) composition having a square-octahedral topology with a fluid containing at least one of $O_2$ and $CH_4$,
wherein the MOF composition comprises aluminum and an organic ligand selected from the group consisting of TCPT, TCDPN, and TCDPA,
sorbing $O_2$ or $CH_4$ from the fluid, and
storing the sorbed $O_2$ or sorbed $CH_4$.

20. A method of removing one or more compounds from a fluid, comprising:
contacting a metal-organic framework (MOF) composition having a square-octahedral topology with a fluid containing at least $CH_4$,
wherein the MOF composition comprises aluminum and an organic ligand selected from the group consisting of TCPT, TCDPN, TCDPA, 2'',3'',5'',6''-tetrabromo-5',5'''-bis(4-carboxyphenyl)-[1,1':3',1'':4'',1''':3''',1''''-quinquephenyl]-4,4''''-dicarboxylic acid, 2'',3'',5''-tribromo-5',5'''-bis(4-carboxyphenyl)-[1,1':3',1'':4'',1''':3''',1''''-quinquephenyl]-4,4''''-dicarboxylic acid, 2'',5''-dibromo-5',5'''-bis(4-carboxyphenyl)-[1,1':3',1'':4'',1''':3''',1''''-quinquephenyl]-4,4''''-dicarboxylic acid, 2'',3''-dibromo-5',5'''-bis(4-carboxyphenyl)-[1,1':3',1'':4'',1''':3''',1''''-quinquephenyl]-4,4''''-dicarboxylic acid, 5',5'''-bis(4-carboxyphenyl)-2''-(trifluoromethyl)-[1,1':3',1'':4'',1''':3''',1''''-quinquephenyl]-4,4''''-dicarboxylic acid, 5',5'''-bis(4-carboxyphenyl)-2'',5''-bis(trifluoromethyl)-[1,1':3',1'':4'',1''':3''',1''''-quinquephenyl]-4,4''''-dicarboxylic acid, 3,3',3'',3'''-([1,1':4',1''-terphenyl]-3,3'',5,5''-tetrayl)tetrapropiolic acid, 3,3',3'',3'''-(ethyne-1,2-diylbis(benzene-5,1,3-triyl))tetrapropiolic acid, 3,3',3'',3'''-(2',3',5',6'-tetramethyl-[1,1':4',1''-terphenyl]-3,3'',5,5''-tetrayl)tetrapropiolic acid, 3,3',3'',3'''-(ethyne-1,2-diylbis(2,4,6-trimethylbenzene-5,1,3-triyl)) tetrapropiolic acid, 4,4',4'',4'''-([1,1':4',1''-terphenyl]-3,3'',5,5''-tetrayltetrakis(ethyne-2,1-diyl))tetrabenzoic acid, 4,4',4'',4'''-(((1,4-phenylenebis(ethyne-2,1-diyl)) bis(benzene-5,1,3-triyl))tetrakis(ethyne-2,1-diyl))tetrabenzoic acid, 5'',5''''''-(1,4-phenylenebis(ethyne-2,1-diyl))bis(([1,1':4',1'':3'',1''':4''',1''''-quinquephenyl]-4, 4''''-dicarboxylic acid)), 5'',5''''''-(1,4-phenylenebis([1, 1':4',1'':3'',1''':4''',1''''-quinquephenyl]-4,4''''-dicarboxylic acid)), 0026BIS, 5,5'-(ethane-1,2-diyl) diisophthalic acid, (E)-5,5'-(diazene-1,2-diyl) diisophthalic acid, (E)-5,5'-(ethene-1,2-diyl) diisophthalic acid, 5,5'-(ethyne-1,2-diyl)diisophthalic acid, (Z)-1,2-bis(3,5-dicarboxyphenyl)diazene 1-oxide, 3,3''',5,5'''-tetrakis{4''''-(4''''-carboxy-[1'''',1'''''-biphenyl])}-1,1':4',1'':4'',1'''-quaterphenyl, and 4,4',4'',4'''-(1, 4-phenylenebis(azanetriyl))tetrabenzoic acid, and
sorbing $CH_4$ from the fluid; and
storing the sorbed $CH_4$.

* * * * *